United States Patent
Griffin, II

(10) Patent No.: US 12,036,704 B1
(45) Date of Patent: *Jul. 16, 2024

(54) CARBON FIBER RECYCLING SYSTEM AND METHOD OF OPERATION

(71) Applicant: Carbon Fiber Recycling, LLC, Tazewell, TN (US)

(72) Inventor: Douglas D. Griffin, II, Tazewell, TN (US)

(73) Assignee: Carbon Fiber Recycling, LLC, Tazewell, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,787

(22) Filed: Dec. 15, 2022

Related U.S. Application Data

(63) Continuation of application No. 17/508,685, filed on Oct. 22, 2021, now Pat. No. 11,578,271.

(Continued)

(51) Int. Cl.
*C10B 11/00* (2006.01)
*B29B 17/04* (2006.01)
(Continued)

(52) U.S. Cl.
CPC .............. *B29B 17/04* (2013.01); *C10B 11/00* (2013.01); *C10B 31/02* (2013.01); *C10B 47/30* (2013.01);
(Continued)

(58) Field of Classification Search
CPC ......... C10B 11/00; C10B 31/02; C10B 47/30; C10B 53/07
See application file for complete search history.

(56) References Cited

U.S. PATENT DOCUMENTS

| 7,922,871 B2 | 4/2011 | Price et al. |
| 8,728,802 B2 * | 5/2014 | Noll ....................... C12M 21/04 |
| | | 435/298.2 |

(Continued)

FOREIGN PATENT DOCUMENTS

| DE | 102008002846.0 B4 | 2/2010 |
| EP | 0636428 A1 | 2/1995 |

(Continued)

OTHER PUBLICATIONS

English Machine Translation of Kook, Kwang Ho; KR 10-1718765 B1; Innovation Q Plus Machine translation. (Year: 2017).
WO-03089212-A—Reference attached as an NPL.

*Primary Examiner* — Jonathan Miller
(74) *Attorney, Agent, or Firm* — Botos Churchill IP Law LLP

(57) ABSTRACT

A method and apparatus for obtaining carbon fiber from carbon fiber waste (e.g., pre-preg and CFP waste). The method and apparatus selects, or is controlled to select, between using an oxygen free pyrolytic process to volatilize the epoxy resin or other matrix in which the fibers are held to liberate the fibers therefrom and, depending upon the type of pre-preg waste, using a reactor environment where the reactor atmosphere has about 1% to about 2% oxygen by volume. The reactor has a counterflow such that the carbon fibers are moved in one direction and the off gasses are moved in the opposite direction. A combination of steam at the reactor outlet and vacuum pressure at the reactor inlet create the counter flow.

34 Claims, 12 Drawing Sheets

Related U.S. Application Data

(60) Provisional application No. 63/107,959, filed on Oct. 30, 2020.

(51) Int. Cl.
  C10B 31/02 (2006.01)
  C10B 47/30 (2006.01)
  C10B 53/07 (2006.01)
  D01F 9/14 (2006.01)
  B29K 63/00 (2006.01)
  B29K 105/12 (2006.01)
  B29K 307/04 (2006.01)

(52) U.S. Cl.
  CPC ............... C10B 53/07 (2013.01); D01F 9/14 (2013.01); *B29B 2017/0496* (2013.01); *B29K 2063/00* (2013.01); *B29K 2105/12* (2013.01); *B29K 2307/04* (2013.01)

(56) References Cited

U.S. PATENT DOCUMENTS

| | | | |
|---|---|---|---|
| 8,900,493 | B2 | 12/2014 | Meier |
| 9,416,253 | B2 | 8/2016 | Gehr |
| 9,932,524 | B1 | 4/2018 | Griffin et al. |
| 10,072,358 | B2 | 9/2018 | Da Cruz et al. |
| 10,240,074 | B2 | 3/2019 | Huang et al. |
| 10,246,569 | B2 | 4/2019 | Bokka et al. |
| 10,343,305 | B2 | 7/2019 | Kano et al. |
| 10,611,966 | B2 * | 4/2020 | Ackerson ............. B01D 5/0075 |
| 10,676,674 | B1 | 6/2020 | Griffin et al. |
| 10,723,954 | B2 | 7/2020 | Gehr |
| 10,899,042 | B2 | 1/2021 | Gehr et al. |
| 11,319,489 | B2 | 5/2022 | Sui et al. |
| 11,427,762 | B2 * | 8/2022 | Ackerson ............. B01D 5/0075 |
| 11,578,271 | B1 * | 2/2023 | Griffin, II ........... B29B 17/0206 |
| 2010/0189629 | A1 | 7/2010 | Price et al. |
| 2013/0256113 | A1 | 10/2013 | Tumiatti et al. |
| 2016/0039118 | A1 | 2/2016 | Gehr |
| 2016/0060535 | A1 | 3/2016 | Gehr |
| 2016/0153123 | A1 | 6/2016 | Da Cruz et al. |
| 2017/0165876 | A1 | 6/2017 | Goh et al. |
| 2017/0203384 | A1 | 7/2017 | Zhao et al. |
| 2018/0050908 | A1 | 2/2018 | Lòpez Urionabarrenechea et al. |
| 2018/0291174 | A1 | 10/2018 | Gross et al. |
| 2019/0039266 | A1 | 2/2019 | Gehr et al. |
| 2019/0047181 | A1 | 2/2019 | Gosau et al. |
| 2019/0127644 | A1 | 5/2019 | Sui et al. |
| 2019/0218361 | A1 | 7/2019 | Wang |
| 2020/0002619 | A1 | 1/2020 | Sui et al. |

FOREIGN PATENT DOCUMENTS

| | | | |
|---|---|---|---|
| EP | 2282879 | A1 | 2/2011 |
| EP | 2152487 | B1 | 6/2011 |
| KR | 101718765 | B1 | 3/2017 |
| WO | 03089212 | A1 | 10/2003 |
| WO | 2010075952 | A1 | 7/2010 |

* cited by examiner

CARBON FIBER RECYCLING SYSTEM AND METHOD OF OPERATION

CROSS-REFERENCE TO RELATED APPLICATION

This application is a continuation of U.S. patent application Ser. No. 17/508,685 filed Oct. 22, 2021, which claims the benefit of priority from U.S. Patent Application No. 63/107,959 filed Oct. 30, 2020, which is incorporated by reference herein.

TECHNICAL FIELD

Described herein are methods and apparatus for recovering or recycling carbon fibers from carbon fiber-containing articles, in particular from carbon fiber-reinforced plastics (CFPs), preferably from carbon fiber-containing or carbon fiber-reinforced composites (composite materials) in which the presence of oxygen in the reactor is selectable and optional.

BACKGROUND

In general, carbon fiber-reinforced plastics (also known synonymously as CFPs) in which a multiplicity of carbon fibers are embedded, preferably in a plurality of layers, as reinforcement in a matrix such as plastic can be referred to as fiber-plastic composites. Suitable polymer matrices can either be thermosets such as epoxy resins, acrylates and polyurethanes and thermoplastics such as acrylonitrile-butadiene-styrene (ABS), polyamide (PA), polylactate (PLA), polymethyl methacrylate (PMMA), polycarbonate (PC), polyethylene terephthalate (PET), polyethylene (PE), polypropylene (PP), polystyrene (PS), polyether ether ketone (PEEK) and polyvinyl chloride (PVC). However, it is also possible to embed carbon fibers in a matrix composed of ceramic (also referred to synonymously as ceramic fiber composites) in order to obtain thermally very stable components such a brake disks.

CFPs have a high strength and stiffness combined with a low weight and are preferably used in fields where high weight-specific strengths and stiffnesses are required. For example, CFPs are used in the aerospace industry, in the wind power industry, in vehicle construction or for sports equipment such as bicycle frames, speed skates, tennis rackets, sporting arrows and fishing rods. In building and construction, CFPs can be adhesively bonded in the form of lamellae on the surface of the component in order to reinforce constructions.

The strength and stiffness of materials or components produced from CFPs is generally, as in the case of other fiber-matrix composites, significantly higher in the fiber direction than transverse to the fiber direction. Thus, for example, the strength transverse to the carbon fibers can be lower than the strength of the matrix material used. In order to ensure a uniform strength and stiffness of the materials or components composed of CFPs in all directions in space, individual fiber layers are laid in various directions. For example, in the case of high-performance construction components, the fiber directions can be determined by means of computer calculations such as the classical laminate theory in order to achieve the prescribed strength and stiffness.

The primary carbon fibers (also referred to synonymously as virgin fibers) used in the production of CFPs are predominantly produced industrially from carbon-containing starting materials, in particular polyacrylonitrile (PAN), by stabilization reactions in air, subsequent pyrolysis in an inert atmosphere and subsequent graphitization. The stiffness and strength of the primary carbon fibers can be controlled in a targeted manner during the production process by means of the pre-tensioning and also the temperatures in the carbonization and graphitization, so that various fiber types are commercially available. Owing to their inexpensive production, HT fibers (high-tensile fibers) and IM fibers (intermediate modulus fibers) are predominantly used as primary carbon fibers. In order to improve the adhesion of the primary carbon fibers after graphitization, an oxidation of the surface of the primary carbon fibers can be carried out by means of an electrochemical treatment. In general, the primary carbon fibers are combined with a surface agent such as bonding agents and sizings (e.g., epoxy resin) and collected together to form rovings. These rovings are wound up onto conventional textile spindles in a last step.

Depending on the length of the primary carbon fibers used, various processes can be used for producing CFPs. CFP parts having long primary carbon fibers can generally be produced by means of resin injection processes (also referred to as resin transfer molding (RTM)). In a first step of the resin injection process, preforms which consist of one layer or a plurality of layers of woven primary carbon fibers in order to ensure constant strength and stiffness in all directions in space are produced. These preforms are, in a second step, admixed in a closed casting mold with a liquefied matrix composed of plastic and optionally hardener. After curing of the matrix and removal of excess edge material, the corresponding CFP components are obtained.

The production of CFPs having short primary carbon fibers, in particular chopped primary carbon fibers, is generally carried out by means of injection molding. For this purpose, the chopped primary carbon fibers are mixed batchwise with a liquefied matrix composed of plastic(s), extruded and subsequently processed by means of injection molding to give CFP components. However, the use of CFPs leads, in comparison with the use of similar components composed of light metals such as aluminum, magnesium and titanium, to considerably higher costs of the final product. This is related, in particular, to the complicated and costly production of primary carbon fibers from carbon-containing starting materials, in particular PAN. In addition, the worldwide consumption of primary carbon fibers for producing CFP components is increasing greatly, so that no significant reduction of the costs in the use of carbon fiber-reinforced plastics can be expected because of the high worldwide demand for primary carbon fibers.

Despite the high demand for primary carbon fibers, large quantities of primary carbon fibers which are unprocessed but have been pre-impregnated with an epoxy resin (referred to as pre-preg or pre-impregnated fibers), in which the resin has been cured or which have exceeded the storage date, are disposed of as CFP-containing scrap. Carbon fiber waste, as used herein, includes pre-preg and dry forms of carbon fiber that are to be recycled, in addition to CFP scrap.

In addition, a large amount of CFP-containing plastic scrap is created in the production of aircraft parts, wind turbine blades and also as a result of modeling molds, production scrap, prototypes, incorrect batches and "end-of-life" components. Disposal of all of this scrap is necessary.

However, the disposal of CFP-containing plastics scrap in landfills is uneconomical because of the valuable carbon fibers present therein. Furthermore, it can generally be expected that the CFP-containing plastics scrap remains unchanged over a long period of time because of its chemical inertness and cannot be degraded in landfills. In addition, unlimited disposal of CFP-containing scrap is not readily possible or even prohibited because of legal requirements in many European countries.

There is therefore a great demand for inexpensive and efficient pyrolysis plants and processes for recovering or recycling carbon fibers from CFP-containing scrap, in particular in the light of the worldwide demand for carbon fibers for the production of CFP components.

In the prior art, carbon fibers are recovered or recycled from CFP-containing material (CFP material) by means of either pyrolysis, mechanical grinding, solvolysis, microwaves, fluidized bed, or combustion. In pyrolysis, there is a thermal dissociation of organic compounds, in which large organic molecules are split into smaller organic molecules by means of high temperatures, for example in the range from 300 to 1000° C. In general, no oxygen is introduced during the pyrolysis. However, pyrolytic processes that use oxygen for carbon fiber recovery from CFP material have been proposed.

A pyrolysis plant is described in the document EP 0 636 428 A1. There, a protective gas furnace in which CFP-containing material is pyrolyzed under a protective gas atmosphere is used for carrying out the pyrolysis. However, the pyrolysis is carried out over a long period of time, as a result of which the recycling is uneconomical and is not suitable for the industrial scale. Furthermore, a complicated after-treatment of the recycled materials with further pyrolysis steps is provided in order to obtain carbon-containing shaped bodies.

Furthermore, circulation of the CFP material is not possible in the known pyrolysis plants using belt furnaces and the processes carried out therein for recovering carbon fibers from CFP material. There is therefore no mixing of the CFP material and accordingly also no uniform heating of all regions of the CFP material present on the conveyor belt. The result is considerable pyrolysis and resin residues on the surface of the recycled carbon fibers, which can have an adverse effect on incorporation into a polymer matrix.

Such a pyrolysis plant is described, for example, in the document DE 10 2008 002 846 B4 and in the patent family equivalent EP 2 282 879 A1. The pyrolysis of the polymer matrix is carried out in a pyrolysis plant which comprises a belt furnace, with the CFP-containing scrap firstly having to be presorted and subsequently comminuted to small sizes. In addition, it is necessary to carry out after-treatment of the recycled carbon fibers in order to avoid tangling of the recycled carbon fibers.

In addition, the document WO 2010/075952 A1 describes a pyrolysis plant that has a process chamber in the form of a belt furnace or rotary tube furnace. The process chamber has both heating sources in the form of hot air inlets and electric resistance heating elements and also microwave radiation sources, which is why a complicated apparatus is consequently necessary for carrying out the recycling.

Finally, the document EP 2 152 487 B1 describes a pyrolysis plant having a belt furnace, with the proportion of oxygen in the belt furnace being controlled in a targeted manner by means of control devices so that essentially a pyrolysis and no combustion or gasification of the polymer matrix occurs.

Furthermore, the above-mentioned pyrolysis plants and processes lead not only to the large amount of pyrolysis residues on the surface of the recycled carbon fibers but also to high costs for the recovery (recycling) of carbon fibers from CFP-containing scrap because of their complexity. In addition, the surfaces of CFP-containing scrap are not treated uniformly in the above-mentioned pyrolysis plants and processes because they lack the necessary mixing. The recycled carbon fibers also frequently display quality fluctuations.

In addition, the CFP-containing scrap has to be pretreated in a complicated and expensive fashion, in particular by means of mechanical and/or chemical processes, before recovery (recycling).

For this reason, the use of recycled carbon fibers in CFP components has hitherto been possible to only a limited extent because of the above-described disadvantages.

US Patent Publication No. 2016039118 describes the use of an indirectly heated rotary tube furnace having exit openings that is used for recovering (recycling) carbon fibers from carbon fiber-containing plastics. In this reference, an indirectly heated rotary tube furnace is used to precisely control the oxygen content within the indirectly heated rotary tube furnace. However, burning the CFP scrap to remove contaminants therefrom damages the carbon fiber, making it less suitable or even unsuitable for recycling. However, it is difficult to keep the amount of oxygen within a defined proportion. Therefore, alternative arrangements for recovery of carbon fiber from CFPs are sought.

BRIEF SUMMARY

An apparatus for recovering carbon fiber from carbon fiber waste, is described herein. Carbon fiber waste, as used herein, includes, and is not limited to dry fiber, pre-preg waste, and cured epoxy laden and thermoset maiden manufacturing scrap, production waste, and end of life CFP objects. The apparatus has a mechanical feed adapted to carry carbon fiber waste into a reactor, the reactor comprising a rotating drum. The reactor also comprises an inlet end and an outlet end. The inlet end has a first inlet adapted to receive the carbon fiber waste through a port that maintains an essentially oxygen-free environment in the reactor. In the context of the present descriptions, essentially oxygen-free is an atmosphere having an oxygen content that is less than about 0.1% by volume. The inlet end further comprises a gas outlet, the gas outlet maintaining an essentially oxygen-free environment in the reactor. The outlet end of the reactor is opposite the inlet end. The outlet end has an outlet for recovered carbon fiber conveyed from the reactor. The recovered carbon fiber outlet maintains an essentially oxygen-free environment in the reactor. The outlet end also has a vapor inlet, the vapor inlet maintaining an essentially oxygen-free environment in the reactor. The vapor can include steam either alone or in combination with nitrogen or other inert gas. The steam has a temperature of about 100° C. The rotating drum has an internal pressure of about atmospheric pressure to about −5 oz/in$^2$ (−21.546 mbar). In some embodiments, the vacuum pump system is fluidically connected to the reactor to introduce a partial vacuum into the reactor; wherein the partial vacuum causes the steam to flow toward the inlet end of the reactor; wherein the reactor pressure in the reactor is a vacuum pressure of about −2 oz/in$^2$ (−8.618 mbar) vacuum to about −5 oz/in$^2$ (−21.546 mbar). Although the inlet and outlet are configured to limit or eliminate the introduction of oxygen into the reactor, the apparatus and method contemplate an oxygen inlet into the reactor that allows for the introduction of a limited, controlled amount of oxygen into the reactor when processing certain types of pre-peg waste. When oxygen is added, the addition is controlled to keep the volume of oxygen in the reactor atmosphere at about 1% to about 2% by volume. When the reactor atmosphere contains oxygen, the temperature in the reactor during processing is about 932° F. (500°

C.) to about 1022° F. (550° C.). As described herein, the oxygen is introduced in a controlled manner. In one aspect, the reactor is in fluid communication with a nitrogen generating system that may be controlled to include a selected amount of oxygen to the reactor along with the nitrogen provided thereby. In another aspect the oxygen may be added to the reactor via a connection separate from the fluid connection between the nitrogen-generating system and the reactor.

The rotating drum is set at an incline toward the outlet end of the reactor. The incline causes the recovered carbon fiber to flow toward the outlet end of the reactor as the drum rotates. Gravity flow causes the recovered carbon fiber to flow from the inlet end of the reactor to the outlet end of the reactor. The inlet end is at a vertical height higher than the outlet end, thereby causing a gravity flow of the carbon-reinforced plastics from the inlet end to the outlet end.

The apparatus also has a burner system. The burner system maintains a reaction temperature in the rotating drum in a range of about 638° C. to about 1093° C. In one example the burner system maintains the reaction temperature at about 667° C.

The outlet for the carbon fiber can be a double gate valve, rotary air locks, double rotary air locks, single gate valves, and screw conveyors or other suitable conveyance for carbon fiber. The mechanical feed for the carbon fiber waste is a feed hopper in fluid communication with a screw conveyor. One example of a screw conveyor is a shaft-less center helical screw.

In some embodiments, the rotary drum has flighting therein. The flighting is typically distributed on the interior surface of the drum in an array with rows of flighting in the axial direction and circumferentially. The flighting serves to mix and distribute the carbon fiber in the rotary drum by collecting the carbon fiber and, as the drum rotates, dropping the carbon fiber therefrom. As the drum rotates and the flights carrying the carbon fiber advance on the upward side of the rotation, the carbon fiber falls from the flighting cascading downward to be received by the flighting in subsequent rows. As such, the flighting has a shaped surface that will collect the carbon fibers. The shaped surface can be curved, or angled (i.e., V-shaped) or bent.

In one embodiment, the rotating drum has a plurality of curved flighting strips attached to an interior surface of the rotating drum. One example of such flighting is a plurality of S-shaped flighting. In another example of such flighting, the shape of the flighting can be J-shaped flighting to aid in manufacturing and durability. The flighting is designed so that it picks up the carbon fiber material like a scoop from the bottom of the rotating drum and carries that material up a sidewall of the rotating drum. As the flighting advances upward with the rotating drum, the flighting shape then causes the carbon material to drop onto the next flight affixed to the rotating drum, and then the flight after that, so that the material is carried back down the sidewall of the rotating drum. It is to be appreciated that other designs suitable for performing the functions of the above-described flighting are considered to be within the scope of the present disclosure.

Other non-linear flighting configurations are contemplated herein. Such flighting is not curved but is an angled strip attached to the interior surface of the drum that will collect the carbon fiber and allow the carbon fiber to fall therefrom and be collected by flighting following the leading flight as the drum rotates the flighting upward. Such flighting has a trough that collect carbon fibers therein. As the rotary drum rotates, the carbon fibers will fall from the flighting when the flighting reaches Also described herein is a pyrolytic method for recovering carbon fiber from carbon fiber waste. According to the method carbon fiber waste is provided to a reactor having a rotating drum. The carbon fiber waste is introduced at a proximal end of the rotating drum. The atmosphere selectively maintained in the rotating drum is one of either essentially oxygen-free or with a small and controlled amount of oxygen added. The flow of the carbon fiber waste is from the proximal end of the rotating drum to the distal end of the rotating drum.

Oxygen-free vapor is introduced into the distal end of the rotating drum to ensure that unwanted oxygen does not enter the reactor with the vapor. The vapor is vented from the proximal end of the rotating drum. The temperature in the rotating drum is about 638° C. to about 1093° C. during carbon fiber recovery when operating in an oxygen-free environment. In some embodiments that pressure in the rotating drum is a partial vacuum in the rotating drum, thereby causing the vapor to flow from the distal end of the rotating drum to the proximal end of the rotating drum. In one embodiment, the vapor includes steam and, optionally, an inert gas. One example of an inert gas is nitrogen.

During the reaction, the pressure in the rotating drum is about atmospheric pressure to less than about $-5$ oz/in$^2$ ($-21.546$ mbar). In one embodiment the pressure in the rotating drum is maintained below atmospheric pressure (e.g., about $-2$ oz/in$^2$ ($-8.618$ mbar) vacuum to about $-5$ oz/in$^2$ ($-21.546$ mbar). The vacuum pressure is selected to cause the vapor to flow in a direction opposite of the direction in which the carbon fiber waste flows in the reactor.

The carbon fiber waste is pyrolyzed in the heated rotating drum. The carbon fiber waste is held at the reaction temperature for a predetermined time sufficient to volatilize a matrix in which carbon fibers are mixed. In one embodiment the matrix is an epoxy/thermoset resin matrix. In one embodiment the temperature in the rotating drum reactor is maintained at about 667° C.

DETAILED DESCRIPTION

Figure 1:
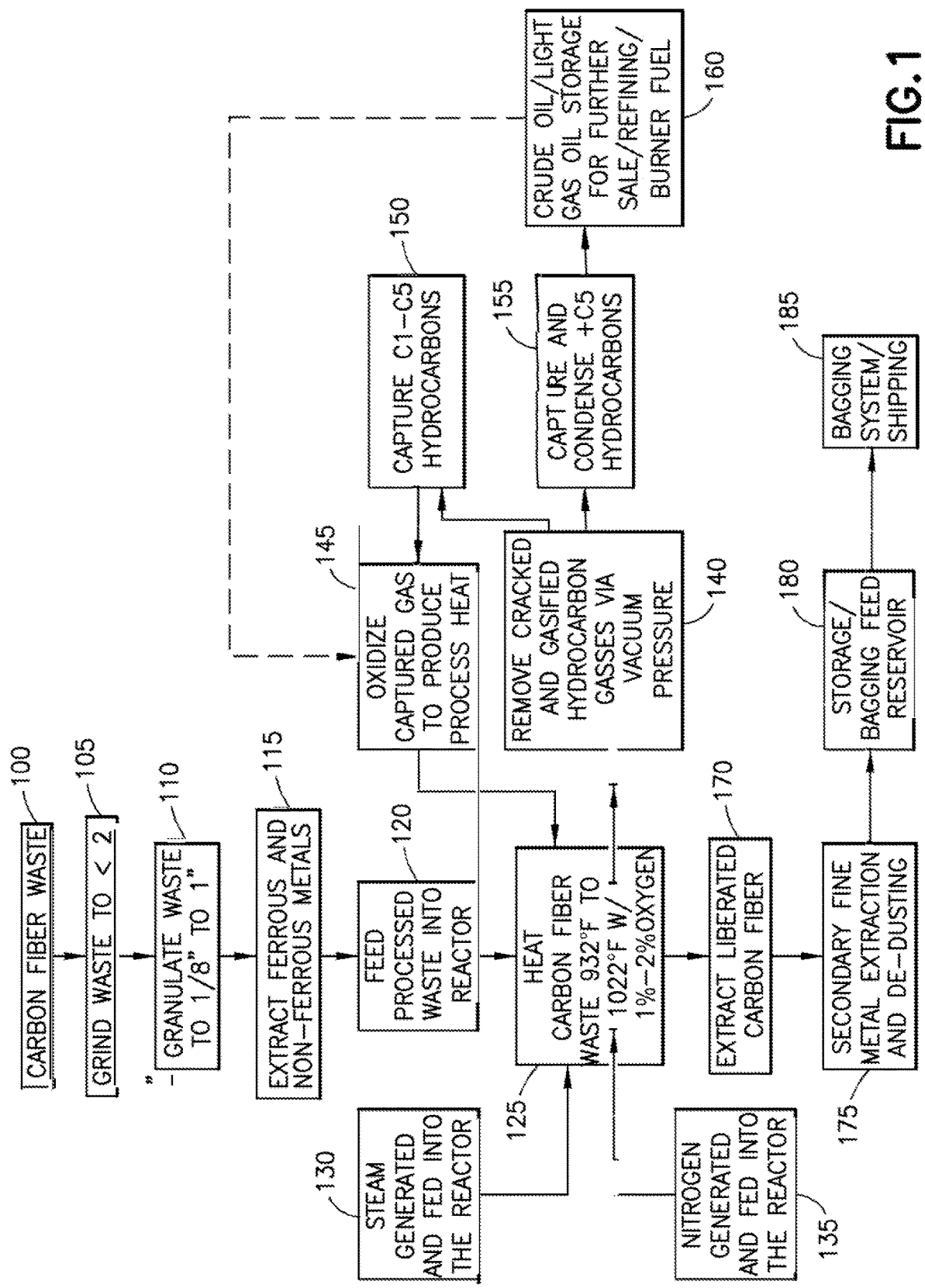
FIG. 1 is a flow chart of the process for recycling carbon fiber described herein.

With reference to FIG. 1 a method for recycling carbon fiber waste (e.g., carbon fiber-reinforced plastics (CFPs)) is described. In step 100, carbon fiber waste that includes one or more of, for example, dry fiber, pre-preg waste, and cured epoxy laden and thermoset-laden manufacturing scrap, production waste, and end of life CFP objects are provided. The examples of carbon fiber waste are exemplary and non-limiting. The method described herein can be used to recycle carbon fiber from the vast array of CFP objects, which are not described in detail herein. References to CFP herein are by way of example and not by way of limitation. The methods and systems described herein can be used to recover carbon fiber from any type of carbon fiber waste and are not limited to recovery of carbon fiber from CFP waste.

In step 105, the waste materials are ground into small pieces or particles. The size of the pieces/particles is about two inches (about 50.8 mm) or less in any single direction. While larger pieces are contemplated, the method described herein is more efficient if the pieces/particles are within the prescribed range. The pieces/particles are obtained by shredding the CFPs using a dual shaft or quad shaft high torque low rpm shredder for the first primary shredding. Such shredders are well known to the skilled person and not described in detail herein. A shredder with a screen on it can size the material more effectively and prepare the waste material to be fed into a granulator.

In step 110, a granulator is used to further reduce the size of the pieces/particles. It is advantageous if the average size of the pieces/particles is about ⅛ inches (about 3.175 mm) or more in any one direction, up to about one inch (25.4 mm) in any one direction. One skilled in the art will appreciate that a granulator can receive small pieces of metals and foreign metallic debris in addition to the CFP pieces/particles.

In step 115, the foreign metal (both ferrous and non-ferrous) is removed from the granulated CFP. The separation can be achieved by using an eddy current separator and a metal detector operating a slide gate removal device in order to remove the non-ferrous metals from the granulated CFP. Eddy current separators are well known to the skilled person and not described in detail herein. The ferrous metals are removed using an arrangement of magnets (e.g., an over-band magnet or a drum magnet of about 3000 gauss). Such magnets are well known to the skilled person and not described in detail herein. In step 120, the resulting CFP waste is fed into the reactor using a shaft-less center helical screw with large enough flights (i.e., the helical band along the shaft) to accommodate the pieces/particle size of the CFP waste. Alternative methods and apparatus for feeding CFP waste into the hopper are contemplated herein. Such alternative methods and apparatus include, and are not limited to, a hydraulic ram feeder. The flights can be continuous or non-continuous. The speed of the helical screw RPM (i.e. the RPM (rounds per minute)) is adjustable. The ground CFP waste is fed into the helical screw from a hopper. The hopper is nitrogen purged to remove the oxygen therefrom, thereby providing an essentially oxygen-free ground CFP waste stream to reactor through the helical screw. The nitrogen purge is provided by a source for nitrogen gas. The pressure of the nitrogen is not too high. A pressure of 5 psi is found to be suitable, but pressures higher or lower than that are also contemplated to be suitable. The slightly elevated pressure of the nitrogen prevents air from flowing into the reactor and supports the countercurrent flow of the steam relative to the carbon fiber flowing out of the reactor at the exit end.

Alternative methods and apparatus for introducing waste materials into the reactor include using a double acting flapper/gate valve. In this embodiment, a conveyor feeds the waste materials into the double flapper valves from above the double acting flapper valves. The double flapper valves are configured to drop the waste materials directly onto the feed screw, thus, in this case, removing the need for a feed hopper. Typically, the double flapper valves are nitrogen—purged. One skilled in the art will appreciate that other mechanisms can be used to introduce the waste materials into the reactor. For example, rotating valves can be used to pass the waste materials into the reactor.

In steps 120 and 125 the waste is pyrolyzed in a flow reactor to a temperature of about 667° C. or about 1250° F. Pyrolysis may occur either in the substantial absence of oxygen or with the addition of about 1% to about 2% by volume oxygen. The system is configured to select between the two operating environments. Step 125 illustrates the operation of the system with the addition of oxygen. When oxygen is added to the system, the operating temperatures are about 932° F. (500° C.) to about 1022° F. (550° C.). The CFP waste is held at the prescribed temperature with enough residence time to volatilize all of the epoxy/thermoset resin matrix in which the carbon fibers are mixed/embedded. The hydrocarbon gasses generated by the pyrolytic reaction are removed from the reactor.

Figure 2:
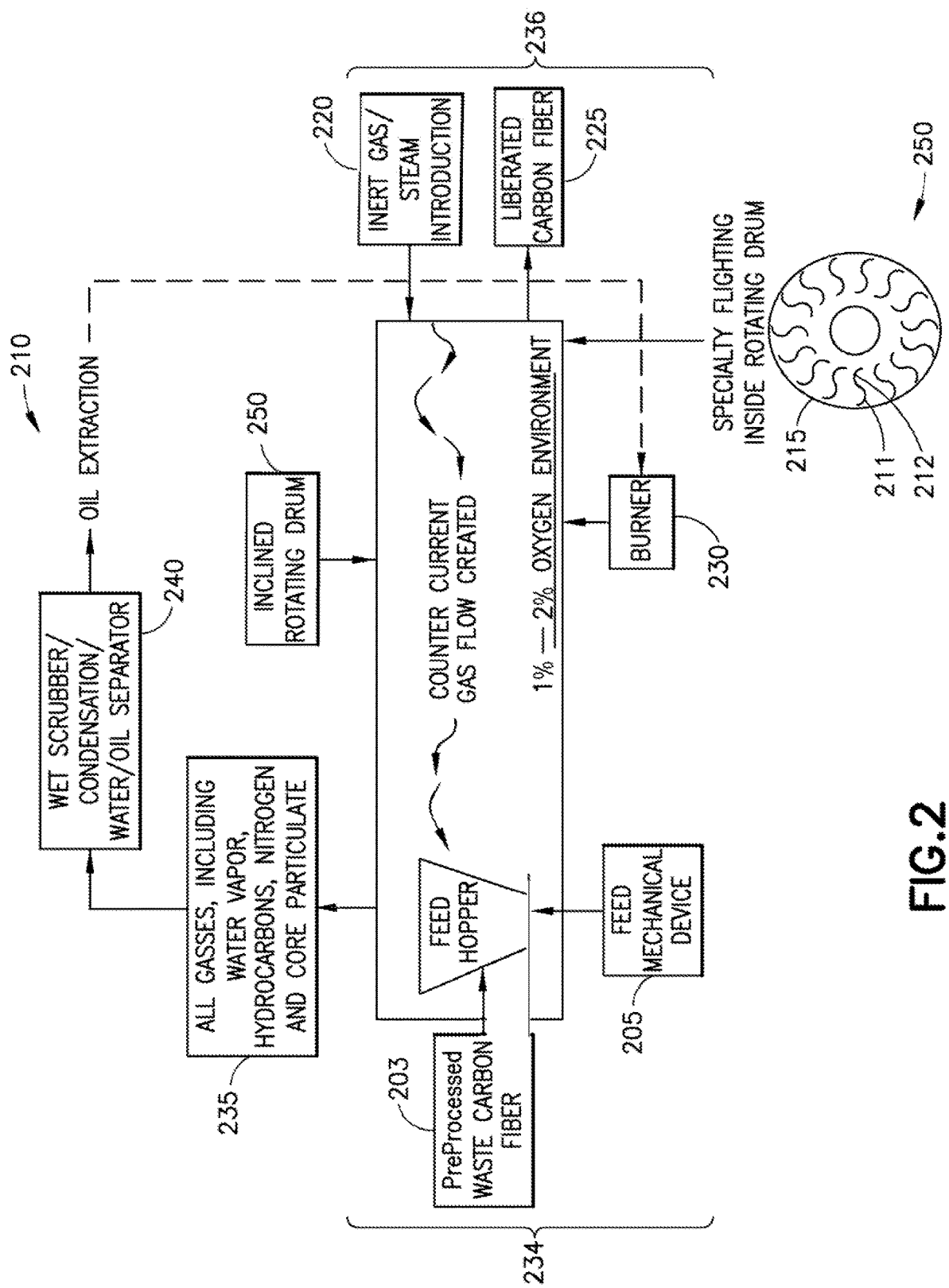
FIG. 2 is a schematic illustration of a system for recycling carbon fiber as described herein.
Figure 3:
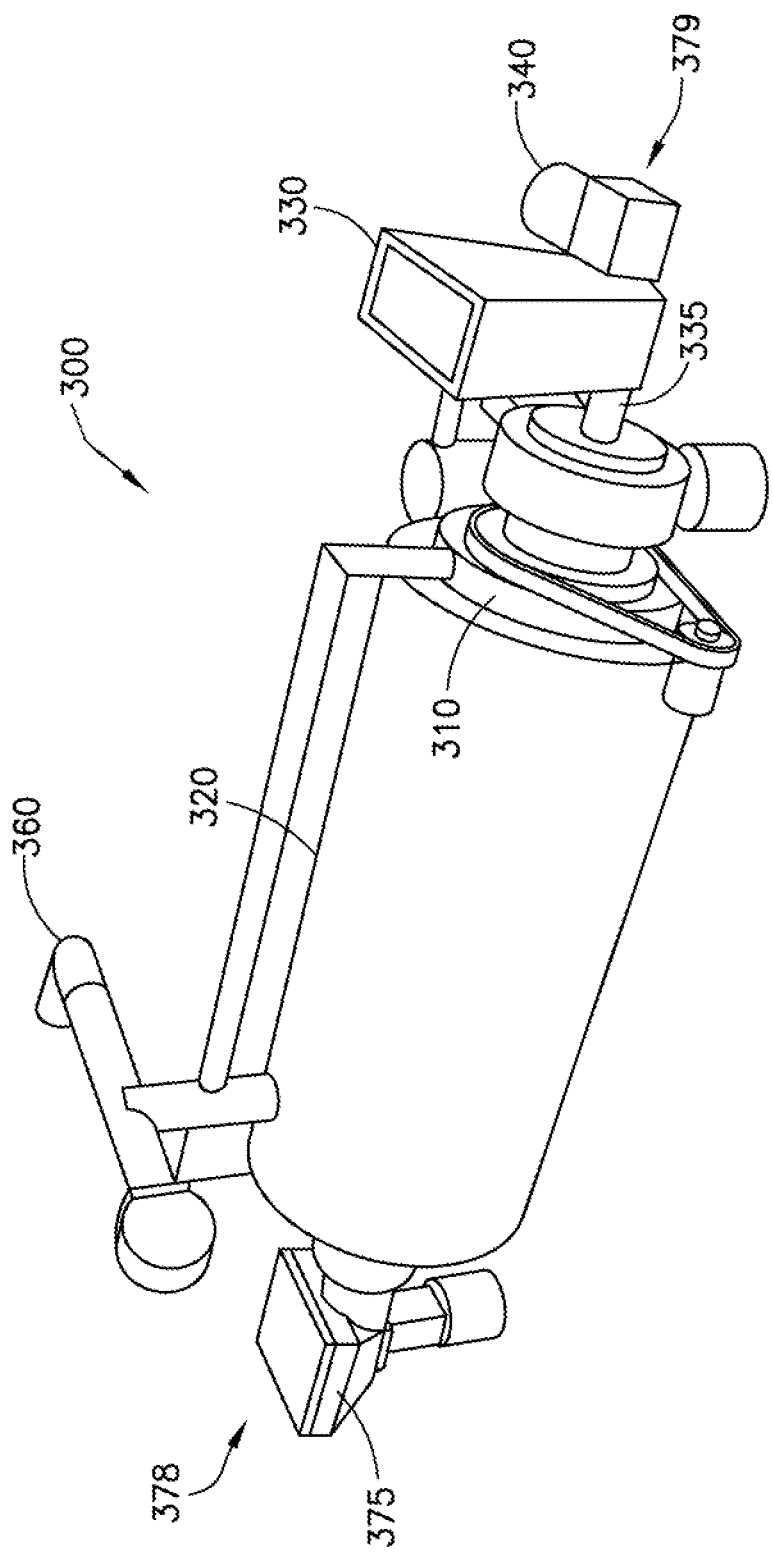
FIG. 3 is a perspective view of a flow reactor according to one embodiment of the present invention.

In step 130, steam is introduced into the flow reactor. The flow reactor is illustrated schematically in FIG. 2. Specific embodiments of the flow reactor illustrated in FIG. 2 are illustrated in FIGS. 3-10. The flow reactor 300 is described by way of illustration and is shown in different perspectives in FIGS. 3-10. One skilled in the art is aware that alternative components can be assembled to practice the pyrolytic process described herein. The flow reactor 300 has a heated rotating drum 310, in a housing 320. One example of a suitable heated, rotating drum is an inclined cylinder made of stainless steel (e.g., 309 stainless steel, 310 stainless steel, RA-253 stainless steel, etc.) or other suitable alloys. The heated, rotating drum 310 is sealed on each end to prevent unwanted oxygen from entering the drum through the sealed ends. An electric motor 350 (FIG. 5) is used to rotate the drum 310. Optionally, the electric motor 350 is controlled by a Variable Frequency Drive controller.

Other heated rotating drums can be made from stainless steel and/or carbon steel or other alloys. One example of a suitable material is RA-253 stainless steel, which has both high strength and high heat resistance, but other materials (e.g., 309 stainless steel, 310 stainless steel, etc.) are also contemplated as suitable. Such other suitable materials for rotating drums are well known to one skilled in the art and not described in detail herein.

Figure 4:
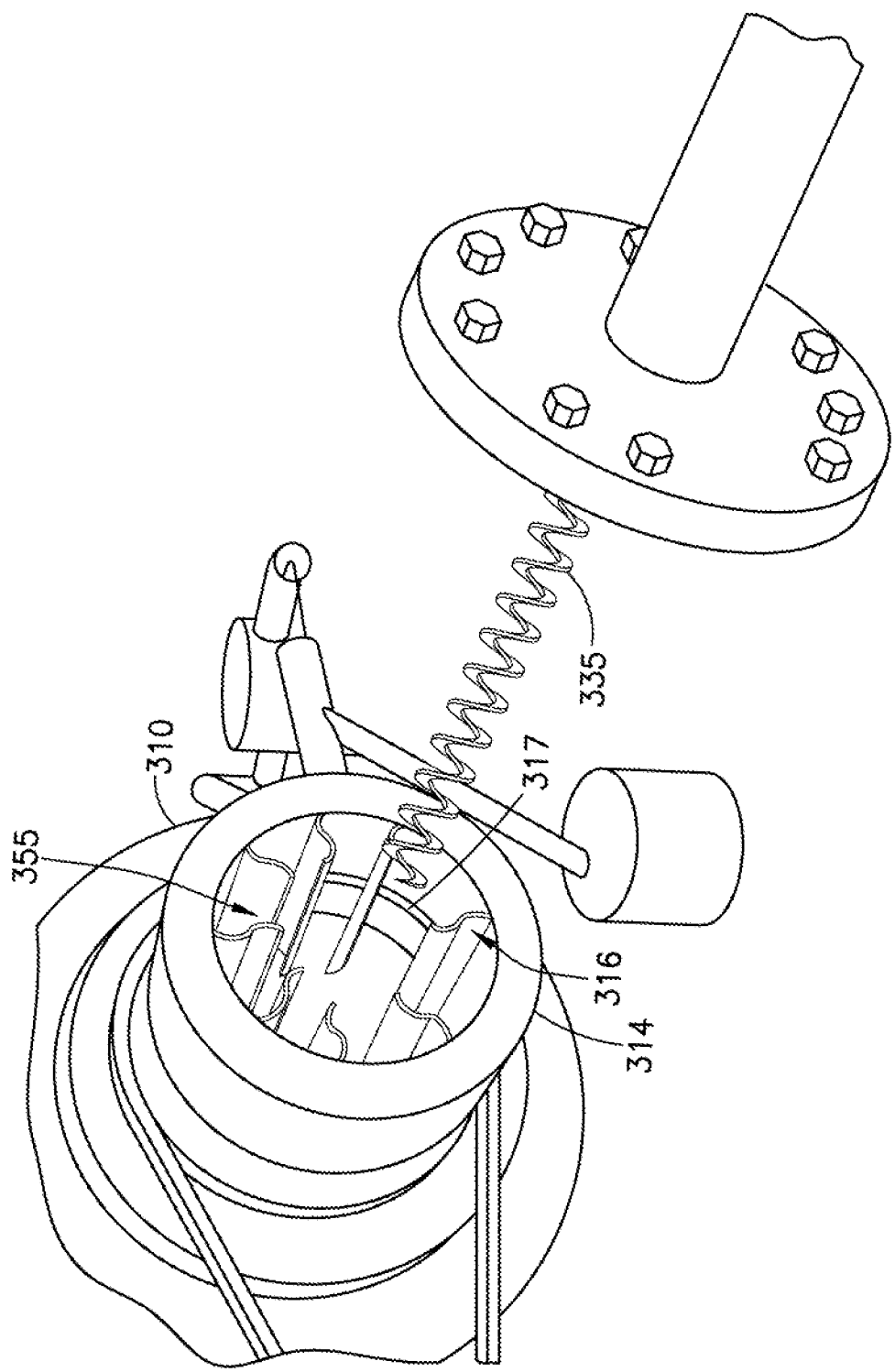
FIG. 4 is an exploded view of the helical screw, flighting and rotating drum of the flow reactor of FIG. 3.
Figure 5:
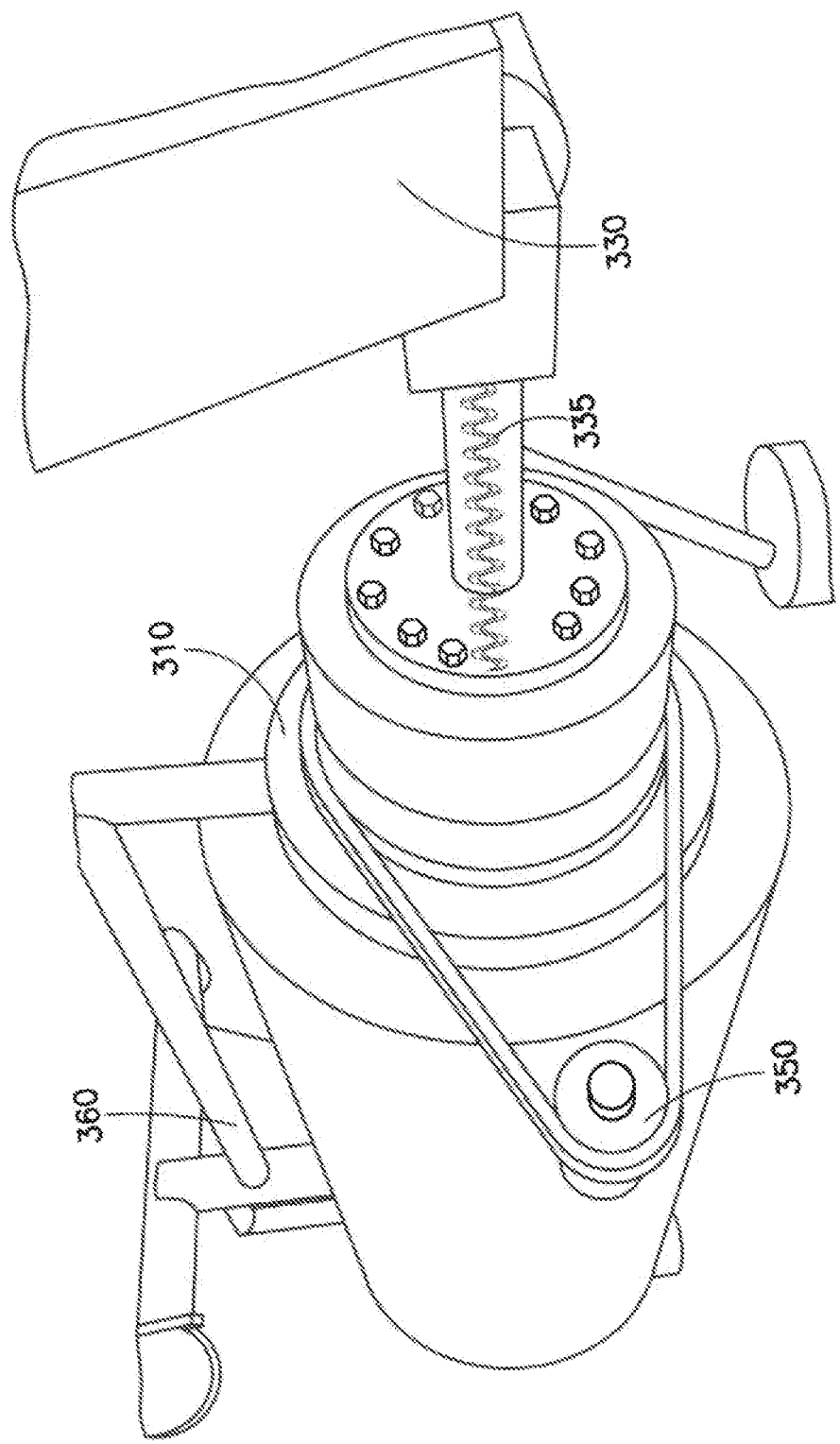
FIG. 5 is a side view of the flow reactor of FIG. 3.

The flow reactor 300 also has a feed hopper 330 and screw 335. The pre-processed carbon fiber waste (e.g., CFP waste) is deposited in the feed hopper 330. A conveying mechanism 335 is used to feed the CFP waste into the rotating drum 310. The conveying mechanism 335 illustrated in FIGS. 4 and 5 is a center-less shaft helical screw. This is merely illustrative, and one skilled in the art is well aware of many other suitable conveying mechanisms for advancing the CFP waste into the conveyor. The helical screw 335 is also driven by an electric motor 340. Optionally, the electric motor 340 is controlled by a Variable Frequency Drive controller. In operation, the helical screw 335 is flood fed by the CFP waste that fills the feed hopper 330. The feed hopper 330 is purged with nitrogen to stop entrained oxygen from entering the rotating drum 310/housing 320 reactor through the hopper. One advantage of the center-less shaft helical screw 335 is that, if it jams, the torque created by the jamming material tends to shorten the helical screw 335 because the helical screw 335 acts like a spring torsion device. Moreover, center-less shaft helical screws aid in unjamming themselves because they change in length as they are torqued. By this action, the point at which the center-less shaft helical screw get clogged is actually moved, causing the center-less shaft helical screw to become "unjammed" automatically. It is to be appreciated that the feed screw does not need to be flood-fed if a nitrogen-purged double acting flapper valve system is provided in place of the hopper system (as described above) to meter in the carbon fiber waste materials.

Burner system (230 (FIG. 2), 400 (FIG. 8, 10)) burns the captured off-gasses created within the indirectly heated rotating drum 310. The burner system 230 (FIG. 2), 400 (FIG. 8, 10) consumes the non-condensable gasses formed from the pyrolytic reaction created by heating the rotating drum (250 (FIG. 2), 310 (FIGS. 3-10)) with the CFP waste inside it.

Suitable burner systems are well known to one skilled in the art and are not described in detail herein. The burner system 400 (FIGS. 8 and 10) can be fueled at least in part by the hydrocarbon off-gas recovered from the reactor. The off-gasses are routed from the reactor through off-gas exhaust piping 360. The hydrocarbon off-gas flow is somewhat variable, with increasing and decreasing volume. After the off-gas has been passed through the scrubber 370, the clean gas is provided to the burner system 400. The burner system 400 captures this gas stream, compresses the gas and meters the gas so it can be burned steadily within the burners. The burners 400 require an excess gas flow to be created in the reactor so that it can consume, at a minimum volume, the gas being produced at the lowest ebbing volume being created in the reactor. Excess gas volume created by the reactor is either flared or captured for alternative use.

In one aspect, gas extraction may be performed using a crossover pipe that connects the reactor to a vapor recovery system. Water is sprayed inside the pipe in a mass quantity sufficient to cool and condense the hot hydrocarbon gasses and also carry condensate materials through the pipe and into the vapor recovery system. For example, about 280 gallons (about 1060 liters) per minute is used to perform gas extraction.

Figure 6:
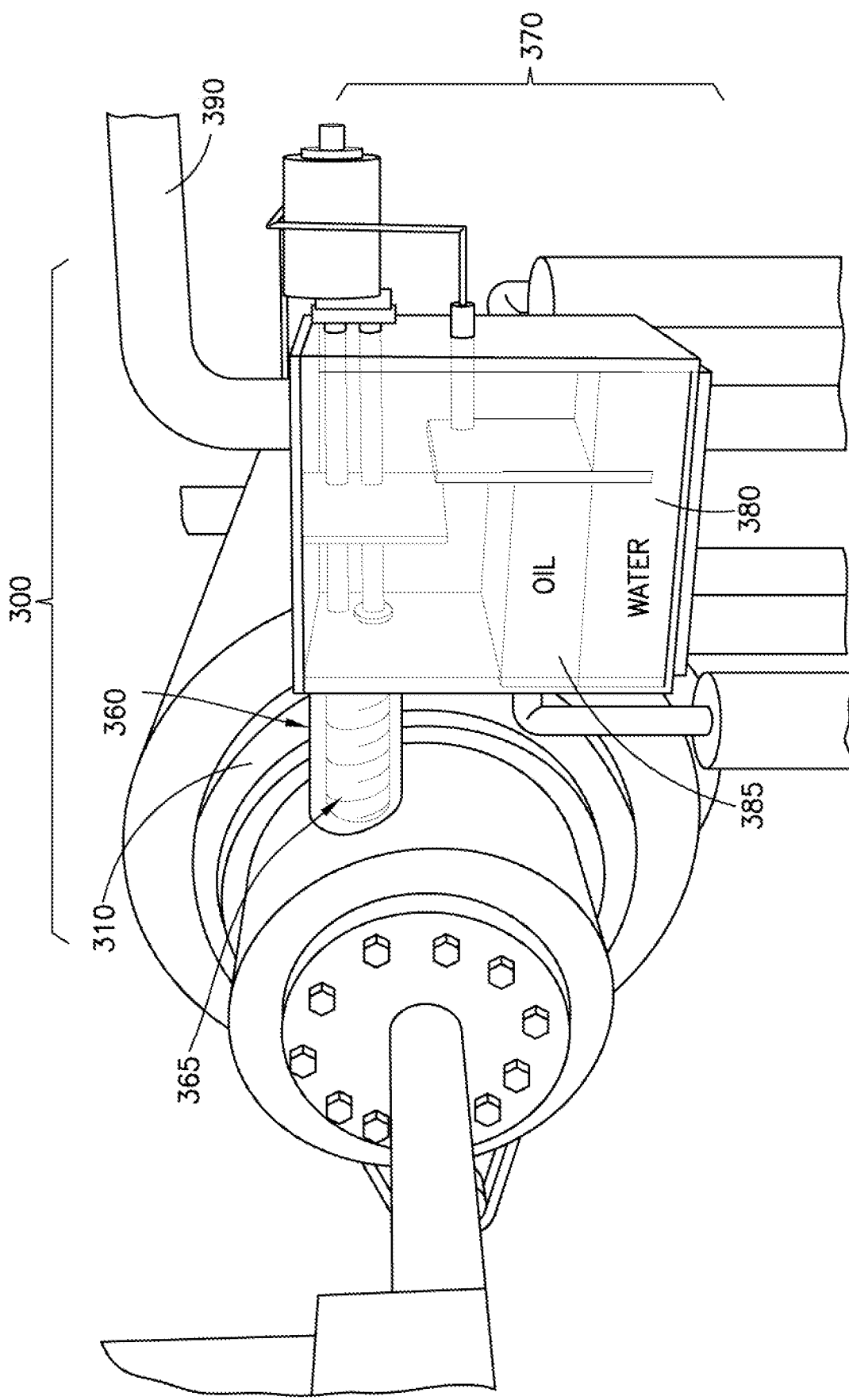
FIG. 6 is a perspective view of a scrubber for integration with the flow reactor of FIG. 3.
Figure 7:
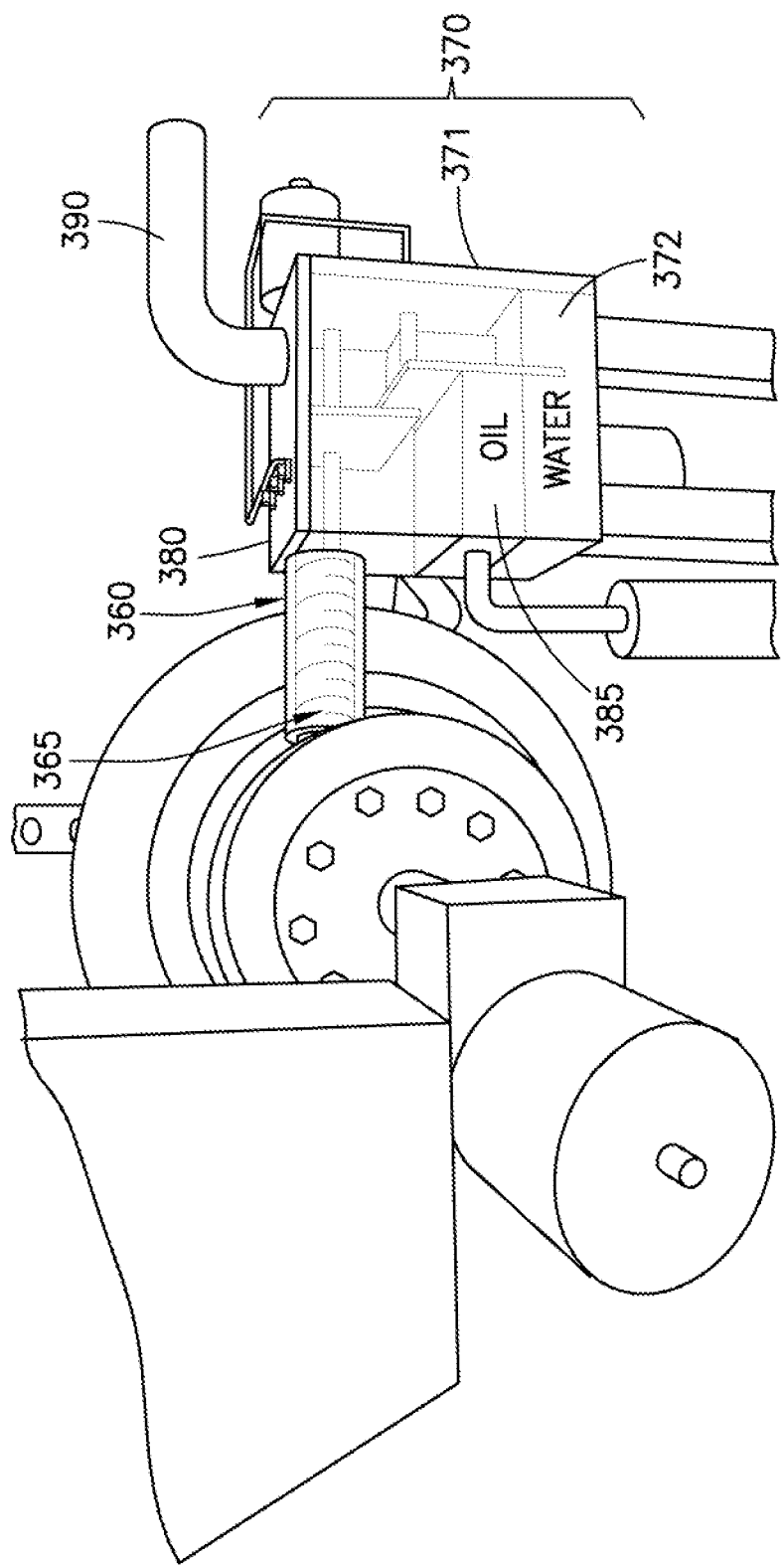
FIG. 7 is a side view of the wet scrubber of FIG. 6.

In another aspect, gas extraction is performed via a pipe system 360 that removes the generated gasses from within the rotating drum 310 and transports them into the wet scrubber 370 (FIGS. 6-7). The pipe system 360 is heated to prevent or mitigate gas condensation as it travels through the pipe system 360 to the wet scrubber 370. The pipe system 360 can be heated in a number of different ways. By way of illustration only, the pipe system 360 can be heated electrically, or by burning some reactor off-gas, or using the hot exhaust gas that results from the combustion of gas to heat the reactor. One skilled in the art is well aware of many different methods and apparatus that could be used to heat the pipe system 360, and the disclosure of particular methods and apparatus is provided herein for purposes of illustration only. Additionally, a counter rotating, self-cleaning double helical screw system 365 can be used to automatically clean the inside of the pipe system 360. The screw system 365 automatically scrapes the inside of the pipe 360 and each alternate helical flight of the screws deposit any collected material back into the reactor 300 to be reprocessed accordingly. Optionally, the screws in the screw system 365 are operated by an electric motor that is also controlled by a Variable Frequency Drive controller. It is to be appreciated that other gas extraction systems may be used for removing gas (e.g., hydrocarbon gas produced) from within drum 310. For example, a vapor recovery unit may be used in place of wet scrubber 310. The vapor recovery unit receives the off-gas from the reactor via the pipe, and blasts the hot gasses with water. In this embodiment, the pipe is not heated using the vapor recovery unit.

Using the crossover pipe to deliver large quantities of water to cool and condense the hydrocarbon gasses mitigates the need to heat the pipe system and use the counter rotating, self-cleaning double helical screw systems described above. Consequently, the screw system operated by a Variable Frequency Drive is an option but not a requirement. The gas extraction in the systems described herein may be used either with the crossover pipe flushed with water or the use of heat and the counter rotating, self-cleaning double helical screw system 365.

Figure 8:
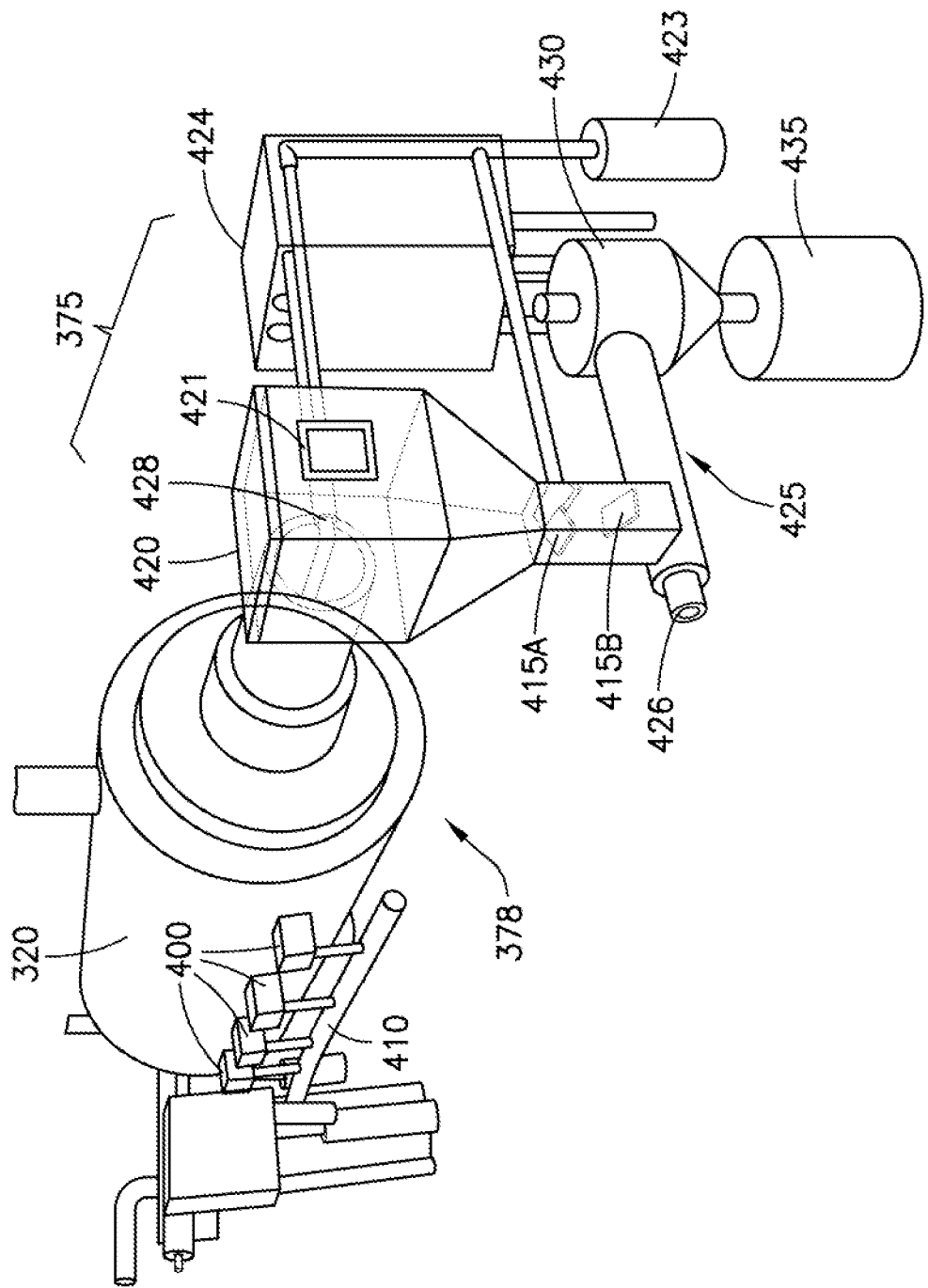
FIG. 8 is a perspective view of one embodiment of the flow reactor described herein from the exit end of the flow reactor.
Figure 9:
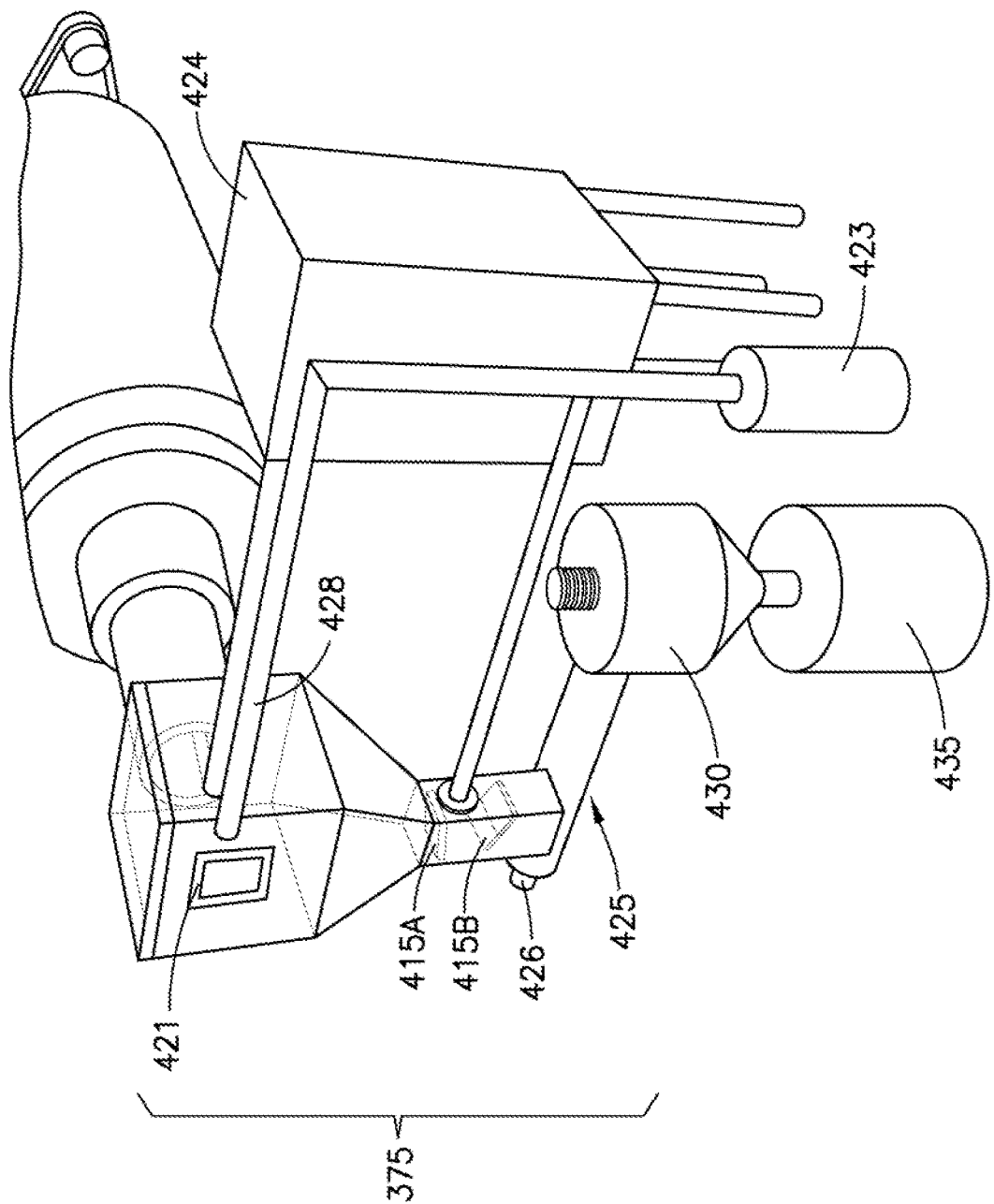
FIG. 9 is the portion of the flow reactor illustrated in FIG. 8, but from a different perspective.
Figure 10:
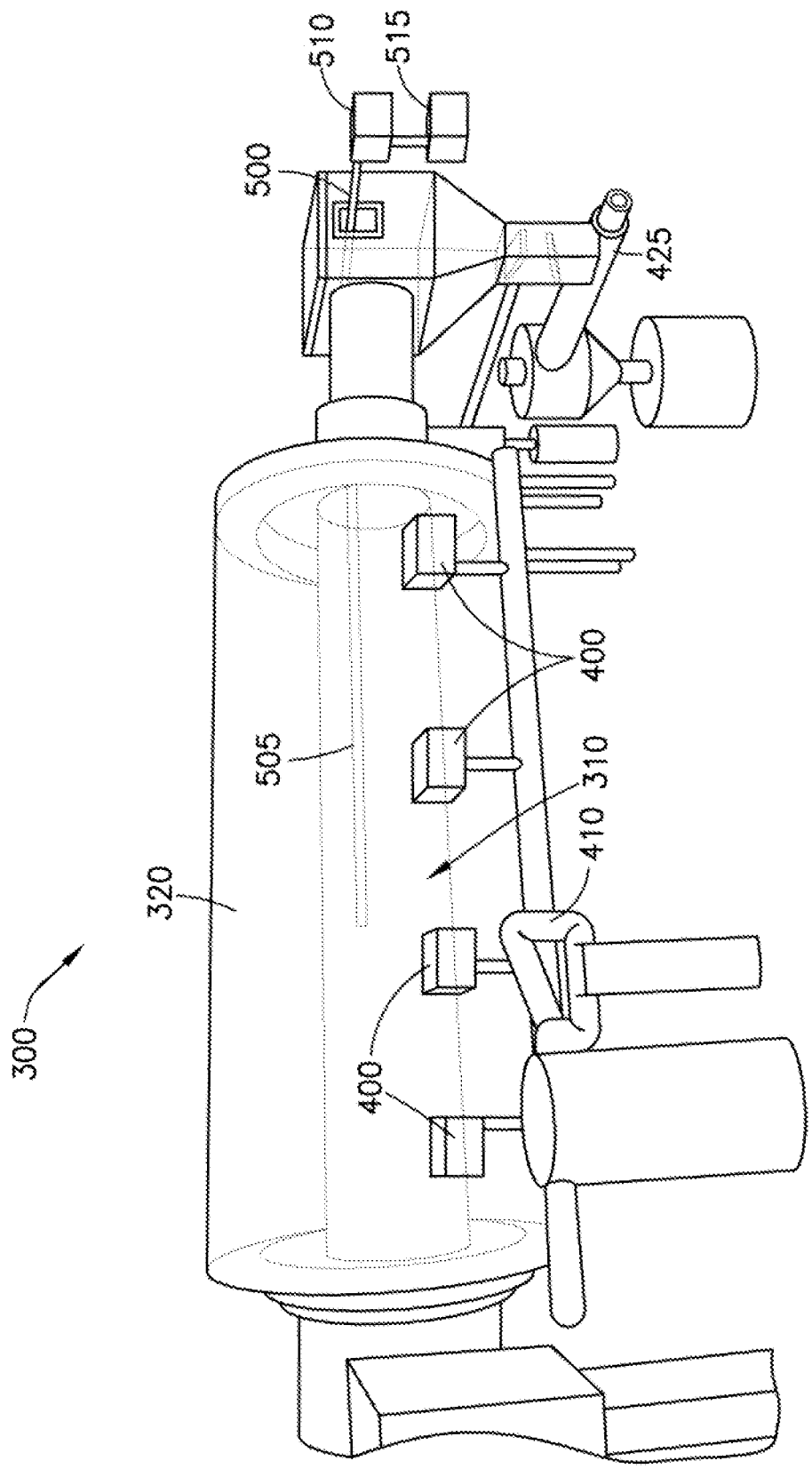
FIG. 10 is a phantom side view of the flow reactor illustrated in FIG. 8.

The system also includes an exit port 375 at the exit end 378 (i.e., the end opposite the end where the gas is recovered from the reactor). The exit end 378 is illustrated in greater detail in FIGS. 8-10. In FIGS. 8-10 the exit port 375 is illustrated as having double gate valves 415A and 415B. The double gate valves are described for purposes of illustration only.

The liberated carbon fiber is removed from the rotating drum 310 through exit port 375, which does not permit unwanted oxygen to be introduced into the reactor. The system also has a conveyer for removing the liberated carbon fiber from the double gate valve and convey it to storage. One example of a suitable device is a pneumatic conveyor 425 illustrated in FIGS. 8-10. The pneumatic conveyor 425 transports the liberated carbon fiber from the double gate valve to the carbon fiber storage. Such a conveyor has a pipe that has a suction fan or vacuum pump that draws air into the pipe. The carbon fiber that falls from the exit port 375 into the pipe gets entrained in the air. The fast-flowing air draws the fiber through the pipe and into the storage bin (435 in FIGS. 8-10). The pneumatic conveyor 425 may include a cyclonic separator to remove the entrained carbon fiber from the fast-moving air stream and drop the entrained carbon fiber into the surge bin 435 for storage. The air from the cyclonic separator is then filtered through a large air filter device to remove any dust/carbon fiber leftovers that might not have been separated from the cyclonic separator. Alternative mechanisms for conveying the liberated carbon from the reactor are contemplated. Such mechanisms are well known to those skilled in the art. For example, the carbon fiber might be conveyed from the reactor using belt conveyors or screw conveyors.

The wet scrubber 370 (FIGS. 6-7) receives the hot gas stream that has been extracted from the flow reactor via pipe system 360. The wet scrubber 370 sprays water 380 onto the gas stream, cooling the gas and condensing it. The condensed gasses form an oil 385. The non-condensable gasses pass through the vent 390 in the scrubber 370 and can be used to feed the burner system.

Steam is created and fed into the reactor through 300 at its exit end 378. The steam creates a large volume of inert atmosphere within the reactor. The steam contributes to the counter current flow by its thermal expansion, and aids in thermal conductivity to help pyrolyze the CFP waste within the reactor. The nitrogen for the inert atmosphere is extracted from the atmosphere and separated from the other elemental gasses combined with the nitrogen in the atmospheric air. The nitrogen is introduced into the exit port 375 at exit end 378. The nitrogen gas performs several functions: 1) the nitrogen is used to prevent or remove gas condensation from the window port 421 (FIGS. 8 and 9) of the reactor; 2) the nitrogen gas is used to purge the feed hopper; 3) the nitrogen gas contributes to providing the counter current inert gas flow within the reactor; 4) the nitrogen also prevents or at least reduces the amount of unwanted oxygen entering the reactor. As stated herein, the reactor is configured such that a small amount of oxygen can be added if certain types of waste are being processed. In one aspect, the amount of oxygen that is added to the system is controlled by controlling the purity of the nitrogen gas introduced into the reactor. A separate port through which oxygen is introduced into the reactor is not required but is not precluded either. The reactor therefore may be configured with one or more ports through which oxygen and nitrogen are introduced into the reactor.

The reactor also has a vacuum pump system that is configured to help to create a −2 oz/in$^2$ (−8.618 mbar) vacuum to −5 oz/in$^2$ (−21.546 mbar) within the reactor. The vacuum is applied at the entrance end 379 of the reactor 300. The vacuum system also contributes to the creation of the counter-current flow within the reactor. The counter-current flow moves the gasses in the direction opposite to the direction in which the carbon fibers are moving as illustrated in FIG. 2. Gasses flowing in the correct direction move out of the reactor and through the gas extraction pipe system 360 described above. The gasses ultimately flow into the wet scrubber 370 through the gas extraction piping. The vacuum system is also operated by an electric motor. The electric motor is optionally controlled by a Variable Frequency Drive controller.

The reactor 300 (with housing 320 and rotating drum 310 shown in phantom) also has a thermocouple feedback loop 500 in FIG. 10 that provides temperature information to the burner system (230 in FIG. 2; 400 in FIGS. 8 and 10). The thermocouple feedback loop 500 automatically maintains the target temperature within the reactor 300. Thermocouple feedback loops are well known to those skilled in the art and are not described in detail herein. In one illustrative example, the thermocouple feedback loop is comprised of 'K' type thermocouple probes 505, which are commercially available. Such probes 505 are mounted inside the rotating drum 310 of the reactor 300. The probes 505 are electrically connected to a thermocouple reader 510. The thermocouple reader transmits temperature data to a throttle controller 515 that runs the burner fuel supply. If the thermocouple probes 505 sense the temperature decline or decrease below a predetermined or preset threshold temperature within the rotating drum 310, such information is transmitted to the thermocouple reader 510. The thermocouple reader 510 then instructs the throttle controller 515 to increase the fuel flow to the burners 400 so that the burners output more heat, thereby increasing the temperature in the reactor 300. If the temperature in the reactor 300 is determined to exceed a predetermined threshold, then the throttle controller 515 reduces fuel flow to the burners 400, thereby reducing the temperature of the reactor 300.

Optionally, the rotating drum 250 (FIG. 2), 310 (FIG. 3) can be equipped with flighting 215 (FIG. 2), 355 (FIG. 4). The flighting 355 within the rotating drum 310 increases thermal energy transfer to the carbon fiber (e.g., CFP) waste material. The flighting increases the surface area of the rotating drum 310 and aids in heat transfer due to the increased amount of the drum surface that is exposed to the interior atmosphere and the CFP waste. In a simple rotating drum 310, the CFP waste is located at the bottom of the drum, which is then the only place where CFP waste is in contact with the drum surface and therefore the only location where thermal energy from the sidewalls of the rotating drum would be conducted to the CFP waste. In a geometric perspective, the fighting ensures that thermal transfer from the drum surface to the CFP waste occurs over the majority of the 360 degrees of the rotating drum interior surface instead of over a maximum of about 60 degrees of the drum surface. The flighting increases the heat transfer efficiency of the rotating drum by about 600% over other conventional rotating drum designs with no flighting.

In one embodiment, the flighting 215 (FIG. 2) has a curved shape when observed from its side profile. The curved shape resembles an "S" shape as illustrated in FIG. 2, in that it has two oppositely oriented curves 211, 212. The radius of curvature for the first and second curved portions can be the same or different. The flighting 215, 355 (FIG. 4) is positioned in the drum 310 such that the portion of the flighting 316 adjacent the interior drum surface 314 forms a scoop. When the CFP material is at the bottom of the rotating drum 310, the scooping portion 316 of the flighting 355 picks up the CFP waste from the bottom of the rotating drum 310 as the drum rotates. As the rotating drum 310 continues to rotate, the CFP waste that is scooped up by the flighting 355 is then carried up the side wall of the rotating drum 310. As the CFP material reaches the top of the rotating drum, it begins to slide down the "S" shaped flighting 355 via gravity and eventually pours the CFP waste out of the scoop portion 314 of the flighting 355. The CFP waste is then captured by the scoop portion 316 of other "S" shaped flights 355 mounted slightly ahead of the subject curved flight. The CFP waste is then carried back down the side wall while the rotating drum 310 continues to turn The CFP ultimately ends up back at the bottom of the rotating drum, where additional CFP waste is scooped up and the process begins again. As the CFP waste moves through to the end of the rotating drum 310 in this manner, because the drum 310 is placed at an angle horizontally such that the entrance end 379 is higher vertically (e.g., relative to a reference point, such as the ground or floor) than the exit end 378, the CFP waste is emptied from the rotating drum 310 at the exit end 378. It is to be appreciated that flighting 355 may be configured in different shapes. Suitable flighting has a shaped surface that will allow carbon fiber to collect thereon. For example, the flighting 355 may be configured to be "S"-shaped, "J"-shaped or some other suitable shapes. The shape for flighting 355 (whether "S" shaped, "J" shaped, or shaped with a bended or angled surface, or using another type of design) is selected such that the shape enables the flighting 355 to carry the material and keep it proximal to the rotating drum surface so the material will be lightly but uniformly distributed over the area inside the drum 310, and conduct heat from the sidewall of the rotating drum 310.

The distance of the distal end 317 of the curved flights 355 from the drum surface 314 is proportional to the diameter of the rotating drum 310. If the flighting 355 is too short, the flighting 355 will not pick up the CFP emptying from the flight 355 as the flight 355 nears the top of the rotation and have the ability to carry the CFP back down the opposing sidewall 314 of the rotating drum 310. If the curves 316 of the flighting are not well defined (i.e., more linear and less arced or curved), the flights 355 will not hold onto the CFP waste long enough to allow it to be carried into a position at the top of the rotation and thus fall onto the next flight 355 to be carried down the sidewall 314 of the rotating drum 310.

The flow reactor has an entrance end 379 into which the ground CFP waste is introduced, and one exit end 378 from which the fiber separated from the waste exits the reactor. The steam is introduced into the exit end 378 of the reactor. The entrance end 379 of the reactor is subject to vacuum pressure (e.g., about −2 oz/in$^2$ (−8.618 mbar) vacuum to −5 oz/in$^2$ (−21.546 mbar). Lower vacuum pressures are suitable (i.e., lower than −5 oz/in$^2$ (−21.546 mbar), but unnecessary and more costly. Lower vacuum pressures increase the potential uncontrolled draw of oxygen into the system. If any seals were to break, uncontrolled amounts of oxygen could be drawn into the pyrolytic reaction environment, creating a volatile environment that risks being explosive. The reactor can be operated at atmospheric pressure as long as the countercurrent flow is created within the rotating drum. Therefore, the range of operating pressures for the reactor are atmospheric temperature to less than about −5 oz/in$^2$ (−21.546 mbar).

The vacuum pressure contributes to creation of a countercurrent gas flow within the reactor. The countercurrent gas flow is held deliberately low to avoid blowing the liberated fiber around the drum interior, which could cause it to become entrained in the exit gas stream, resulting in fiber loss for the system and potentially clogging the wet scrubber with the excess fiber thereby requiring that the scrubber be cleaned more frequently.

The countercurrent flow carries coke particulate such that it is separated from the carbon fiber by the steam injection. The coke particulate is carried out with the hydrocarbon gas stream that exits the reactor through the gas extraction piping 360 at the entrance end 379 of the reactor 300. A countercurrent flow is required for the gas to exit from the entrance end of the reactor.

Nitrogen or other inert gas, or a mixture of such gasses, is introduced at the exit end 378 of the reactor along with the steam to purge oxygen from the reactor. As stated above, the carbon fiber exits the reactor through the exit port 375, illustrated as a double gate valve lock design in FIGS. 8 and 9. The double gate valve lock (415A, 415B) stops any unwanted oxygen from being able to enter the reactor through the fiber exit portal of the reactor. The double gate valve is illustrative. One skilled in the art is aware of alternative valve structures. Examples of alternative valve structures include, but are not limited to, rotary air locks, double rotary air locks, single gate valves, screw conveyors, etc.). The vacuum pump is sized to create the partial vacuum of about −2 oz/in$^2$ (−8.618 mbar) vacuum to −5 oz/in$^2$ (−21.546 mbar) that drives the gas counterflow. The vacuum must be large enough to draw the nitrogen and steam into the correct direction within the reactor and create the countercurrent flow within the reactor rotating drum. The rotating drum is on an incline, so gravity causes the carbon fiber to flow in the opposite direction in relation to steam, nitrogen, and hydrocarbon gas and coke being created. The extent of the incline can be adjusted to ensure that the carbon fiber flows concurrently to the inert gas and steam. In this regard, the countercurrent flow cannot be too great, or the loose carbon fiber within the reactor will become entrained in the gas vented from the reactor through the gas extraction piping 360.

The residence time of the carbon fiber in the reactor 300 depends on total mass of the ground CFP waste provided to the reactor. The flow of the steam into the reactor is controlled based on the total mass of the ground CFP waste and the residence time of the carbon fiber in the reactor. If the amount of steam is too low contaminants may adhere to the carbon fiber because the counter current flow may permit hydrocarbon off-gasses from the CFP waste to circulate towards the carbon fiber exit from the rotating drum. These hydrocarbon off-gasses adhere to the carbon fiber, acting as a contaminant to the liberated carbon fiber. If the amount of steam is too high, the steam can carry the fiber to the entrance end of the reactor and cause fiber loss and increase the likelihood that the gas extraction piping will be clogged by the fiber carried by the steam to the entrance end. The steam is generated at a temperature of approximately 212° F. (100° C.) in a steam generator. This steam is then piped into the reactor via an insulated steam pipe (428 in FIGS. 8 and 9) and pumped into the exit end of the reactor, thus helping to create the countercurrent flow. Of course, the inside of the rotating drum is at a temperature of approximately 1,250° F. (~667° C.), thus causing the introduced steam to thermally expand.

The internal operating temperature of the reactor can be hotter, but higher temperatures consume more energy and may not be economically justified. Temperatures as high as about 2000° F. (about 1093° C.) are contemplated as suitable. Lower temperatures (i.e., temperatures as low as about 1,180° F. (about 638° C.) are contemplated. The temperature of about 1,250° F. (−667° C.), is viewed as a good balance in the range of temperatures described above. Typically, the reactor will be operated at a temperature of approximately 500° C. to about 550° C. to process the pre-pregs into carbon fiber.

The thermal expansion of the steam caused by the steam, which is at about 212° F. (100° C.), entering the much hotter reactor, aids in inert atmosphere creation and helps create the countercurrent flow within the rotating drum as it expands in the exit end of the rotating drum. The steam is at about atmospheric pressure and is not significantly pressurized. The countercurrent flow is also supported by allowing the off-gas from the rotating drum to flow out of the entrance end of the rotating drum. Since the temperature of the steam is far lower than the interior temperature of the rotating drum, the introduction of too much steam can require the consumption of additional energy to keep the reactor at the correct temperature. Also, since the steam condenses inside the wet scrubber, the introduction of too much steam increases the amount of condensed water within the wet scrubber unnecessarily. Introducing too much water into the scrubber can adversely affect scrubber operation. It is to be appreciated that, in some instances, the system may be configured to introduce approximately 1% to about 2% oxygen into the essentially inert atmosphere maintained inside the reactor. If any oxygen is introduced, it will be introduced through the nitrogen inlet. As noted above, the amount of oxygen introduced into the reactor is controlled by controlling the nitrogen purity (i.e., the ratio of oxygen to nitrogen is programmable). More than one nitrogen/oxygen inlet is not needed but is also not excluded. Such at least one inlet is placed at about the mid-point of the reactor (i.e., about halfway between the inlet and the outlet). Due to the countercurrent flow, the introduced oxygen is then carried to the entrance end of the reactor, while leaving the exit end of the reactor essentially oxygen-free. The introduction of oxygen into the mid-point of the reactor (such that it flows toward the entrance end of the reactor while keeping the exit end essentially oxygen-free) may be advantageous for processing some types of pre-preg materials. The above-described process may also be performed at a temperature of approximately 500° C. to about 550° C.

Typically, the amount of steam will be about 20 lbs. to about 30 lbs. per hour as provided by the steam generator 424 for a reactor that has a rotating drum with a diameter of about 10.75 inches (about 273 mm). If the rotating drum is enlarged, a larger amount of steam is also required to be provided, and the additional amount of steam required needs to be mathematically proportional to the diameter of the rotating drum.

In step 140, the hydrocarbon gasses are continuously removed from the reactor 300 from the entrance end 379 of the reactor 300. The gasses have C1 through C50 hydrocarbons and are mixed with water vapor, nitrogen, and other contaminant solids such as carbon fiber strands and coke particulate. The gas stream flows to a wet scrubber with an oil/water separator 371 floatation chamber. Such scrubbers are well known to those skilled in the art and not described in detail herein. In step 150, the low molecular weight hydrocarbons are separated from the hydrocarbon gasses. In step 155, the higher molecular weight hydrocarbons (C5 and above) are captured. In the scrubber, the gasses are cooled, hydrocarbons are condensed, oil 385 is separated from the water vapor and nitrogen, and the coke particulate is separated from the gas stream. The constituent products that result are stored in tanks and cleaned and/or used as desired. The non-condensable gases (i.e., the lower molecular weight hydrocarbon gasses) exit the wet scrubber and are then used to heat the reactor (step 145). The excess gas not needed for thermal energy for the reactor can be flared, or captured for other uses. As noted previously the hydrocarbon gasses are more easily extracted from the reactor due to the action of the vacuum pump at the reactor entrance creating a $-2$ oz/in$^2$ ($-8.618$ mbar) vacuum to $-5$ oz/in$^2$ ($-21.546$ mbar) negative pressure. One skilled in the art will appreciate that a variety of devices can be used to create the desired negative pressure (i.e., the vacuum pressure). For example, a draft fan can be used to create negative pressure within the reactor.

Referring to steps 145-160, the non-condensable gases (i.e., the low molecular weight gasses) created within the reactor can be used to heat the reactor as noted in step 145. Once the reactor has been turned on, heated, and stabilized, as long as new carbon fiber waste is introduced to the reactor, it will create gas that can be used to operate the reactor. This gas can be burned through existing off the shelf gas train technology. Excess gas produced with the low molecular weight hydrocarbons (i.e., between C1 and C5) in excess of that needed to supply the reactor with energy can be captured and compressed or flared. Referring to step 155, the higher molecular weight hydrocarbon (i.e., C6 and longer hydrocarbon) gasses created can be captured and condensed into a light gas oil solution as stated in step 160. This gas solution can be further refined to extract the individual hydrocarbons that make up the mix as needed or desired. This mixture can include ASTM gasoline, ASTM diesel Fuel, ASTM Kerosene, Bunker C fuels, greases, and tars. As stated elsewhere herein, the reactor can be configured to use the condensable or non-condensable hydrocarbon gas created in the reactor as the fuel for the burners, and/or the burners can be fueled by natural gas, oil, propane, or other suitable fuels.

Referring to step 170, liberated carbon fiber is removed from the exit end 378 of the reactor opposite from the entrance end 378 where the granulated CFP is introduced into the reactor. The carbon fiber flows through a double set of gate valves which are purged with nitrogen to stop the back flow of oxygen from entering the reactor. The open/close time interval of these gate valves are adjusted to operate at the throughput rate desired. Such gate valves are known to one skilled in the art and not described in detail herein.

A view of the flow reactor 300 from the perspective of the exit end 378 is illustrated in detail in FIGS. 8 and 9. As explained above, recovered off-gas and other fuel is provided to the gas burner 400 through pipe system 410 that can be used to provide recovered off-gas and other fuel to the gas burner 400. The double gate valves 415A and 415B of the exit port 375 are also illustrated in FIGS. 8 and 9. The exit port 375 also has an exit bin 420 into which the recovered carbon fiber flows from the flow reactor 300. The exit bin 420 has a window port 421 that allows the continuous flow of nitrogen from nitrogen source 423 into the reactor through the exit end 375. The gate valves 415A and 415B are continuously purged by nitrogen from the nitrogen source to ensure that air does not enter the reactor 300. In the aspect where the nitrogen and oxygen are introduced through the same port, the nitrogen generating system may be programmed to produce an exact ratio of nitrogen and oxygen to create a precise atmosphere within the rotating drum reactor. In the aspect where the apparatus is configured with an oxygen supply line to the rotating drum, that is a separate port from the port thorough which the nitrogen is introduced, the oxygen inlet can be installed near the center of the length of the rotating drum. The amount of oxygen introduced into the reactor may be controlled by an oxygen sensor inside the rotating drum that is in communication with a valve that will meter in the oxygen in response to the sensor reading. Such arrangements allow for precision control of the amount of oxygen introduced into the reactor.

The pneumatic conveyor 425 receives the recovered carbon fiber from the double gate valves 415A and 415B. The length of the pneumatic conveyor is largely a matter of design choice, depending on the distance between the reactor and the location to which the recovered fiber it to be conveyed. The carbon fiber is drawn through the pneumatic conveyor 425 by suction fan 430 and is deposited in the storage bin 435. The pneumatic conveyor also has an air intake 426 that is used to buoy the carbon fiber for conveyance through the conveyor.

Referring to step 175, once the carbon fiber has exited the reactor, it is pneumatically conveyed through a zigzag elutriation process for further fine metal decontamination and fine de-dusting requirements. Elutriation is a process for separating particles based on their size, shape and density, using a stream of gas or liquid flowing in a direction usually opposite to the direction of sedimentation. This method is mainly used for particles smaller than 1 μm. Such processes and equipment used for such processes are well known to one skilled in the art and not described in detail herein.

Referring to step 180, once the carbon fiber has been dedusted and metals have been removed therefrom, it is placed into storage. The stored carbon fiber is held in an automatic storage reservoir.

In step 185, the carbon fiber is moved from storage directly into a bagging system which compresses the carbon fiber by vacuum so more of it fits into the bags being filled. Such packaging methods are well known to those of ordinary skill and are not described in detail herein. These bags are then placed onto pallets or into pallet boxes such as Gaylord boxes for shipping. Gaylord boxes are simply one example of a suitable boxes for bulk shipping. The Gaylord boxes are loaded onto trucks and transported to their final end user.

FIG. 2 is a schematic diagram of a system that is used to practice the method described above. Pre-processed carbon fiber waste 203 is introduced into the system and includes shredded and granulated dry carbon fiber, prepreg carbon fiber, and cured epoxy and thermoset laden carbon fiber waste sized to a particle size of approximately one inch in any one direction.

A feed mechanical device 205 may be the center less shaft helical screw as previously described and illustrated in FIGS. 4-5. As explained above, the screw 335 is flood fed with the CFP waste from the hopper 330 that is purged with nitrogen and is atmospherically controlled to stop the infiltration of unwanted oxygen from entering the entrained waste supply into the reactor 300. The center-less shaft helical screw 335 provides spring torque and length variability in the event that the CFP waste jams the helical screw. The speed of the infeed is controllable via variable frequency drive. As noted above, if a double flapper valve system is used in place of the feed hopper, the feed screw does not have to be flood-fed since it is purged with nitrogen.

The reactor 210 (illustrated schematically in FIG. 2), is illustrated as 300 in FIGS. 3-10, as an indirectly heated rotating calciner 300. Other alternatives to the reactor specifically described herein are contemplated. Suitable reactors accommodate pyrolytic processes. As noted above, reactors that require oxygen (e.g., direct fired reactor, in which a flame is burning inside the rotating drum) are not suited for the method and apparatus described herein. To maintain the vacuum and ensure an oxygen-free environment (or to ensure that no unwanted or uncontrolled amounts of oxygen are added when a small amount (1% to 2% by volume) of oxygen is added), the rotating calciner reactor has protective seals on each end of the rotating drum 250. The reaction occurs at a temperature in of about 1250° F. or about 667° C. in an oxygen-free environment. The introduction of oxygen into the mid-point of the reactor (either through the same port as the nitrogen or through a separate port such that it flows toward the entrance end of the reactor while keeping the exit end essentially oxygen-free) may be advantageous for processing some types of pre-preg materials. As noted above, if the oxygen is introduced with the nitrogen, the amount of oxygen may be controlled by programming a change in the oxygen-to-nitrogen ratio in the nitrogen generation system. The above-described process may also be performed at a temperature of approximately 500° C. to about 550° C.

Thermocouple probes inside the rotating drum 250 allow for a feedback loop to be created to control the temperature precisely. The rotating drum 250 is placed on a slight angle so that the rotation of the drum causes the materials within the rotating drum to flow towards the exit end. Since the rotating drum 250 has an orientation that provides some gravity feed from the entrance end 379 to the exit end 378, the exit end 378 is also the "downhill" side of the reactor. As noted elsewhere herein, optionally, a controlled oxygen environment can be created in the apparatus described herein (by introducing oxygen into approximately the midpoint of the reactor) to process certain types of pre-preg materials from the center of the length of the rotating drum 250. Again, in those aspects where the oxygen is introduced with the nitrogen, the amount of oxygen introduced is controlled by programming the ratio of the oxygen-to-nitrogen generated by the nitrogen generating system.

The carbon fiber waste is both agitated and moved along the side walls of the reactor using flighting. The flighting 215 is illustrated in the rotating drum 250 cross section. The flighting 215 is specifically set up in a way that maximizes the side wall space to transfer thermal energy from the side wall of the rotating drum to the carbon fiber waste. The flighting 215 is a plurality of approximately S-shaped strips extending from the interior surface of the rotating drum that have curved portions 211, 212 that are open in opposite directions and having the same or different radii. Optionally, a center drum is installed within the rotating drum to increase the effective heating surfaces within the reactor, which in turn increases the processing speed of the carbon fiber waste, which in turn increases the efficiencies of the reaction.

Figure 13:
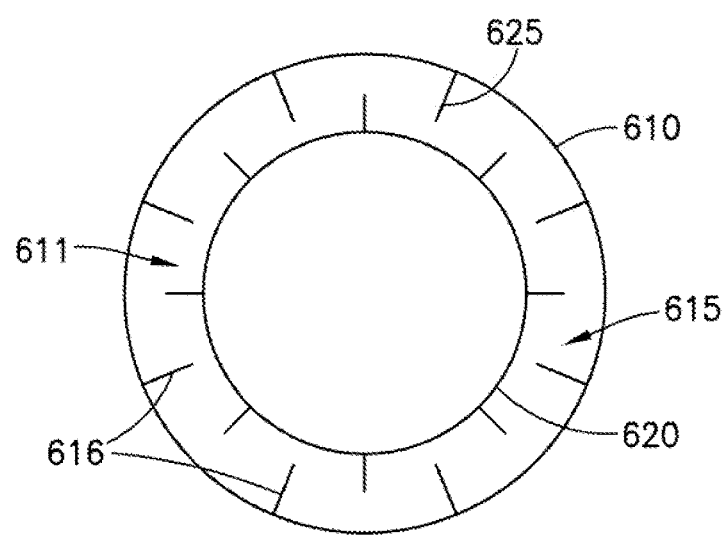
FIG. 13 illustrates a dual drum construction where the interior of the outer drum and the exterior of the internal drum define the space where the carbon fiber is processed by the reactor.

FIG. 13 illustrates such a two drum construction. The outer drum 610 has an interior drum 611 disposed therein. The inner surface 615 of the outer drum 610 is separated from the outer surface 620 of the inner drum 611 by a distance 625. The distance 625 is largely a matter of design choice but should have sufficient space to ensure that the carbon fiber material can travel between the inner drum 611 and the outer drum 610. Both the inner surface 615 of the outer drum 610 and the outer surface 620 of the inner drum 611 have flighting 616 disposed thereon. The flighting 616 is spaced so that the flighting 616 on the outer surface 620 of the inner drum 611 is spaced between flighting disposed on the inner surface 615 of the outer drum 610. The inner drum 610 and outer drum 611 rotated at the same speed and in the same direction.

Figure 11A:
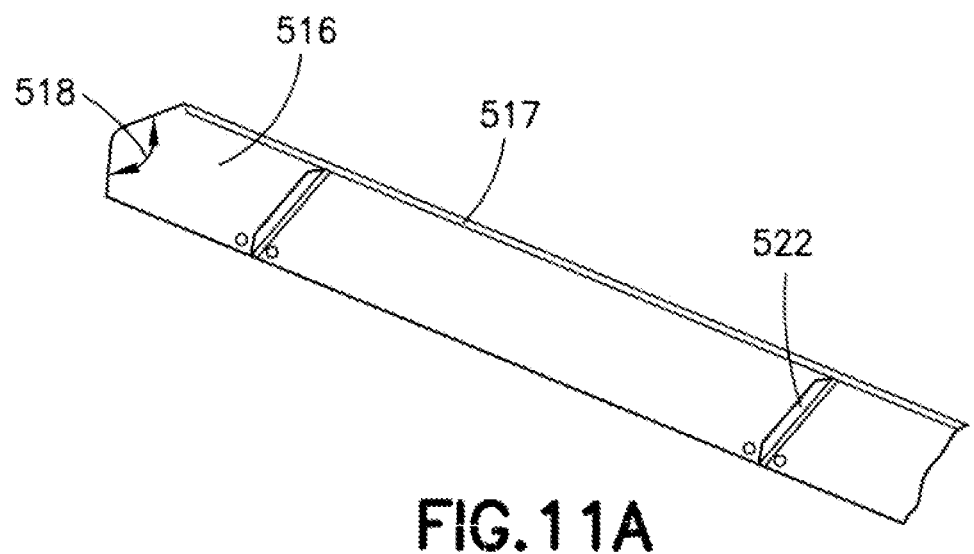
FIGS. 11A-11B illustrate angled flighting for the reactor according to one embodiment of the present invention.
Figure 11B:
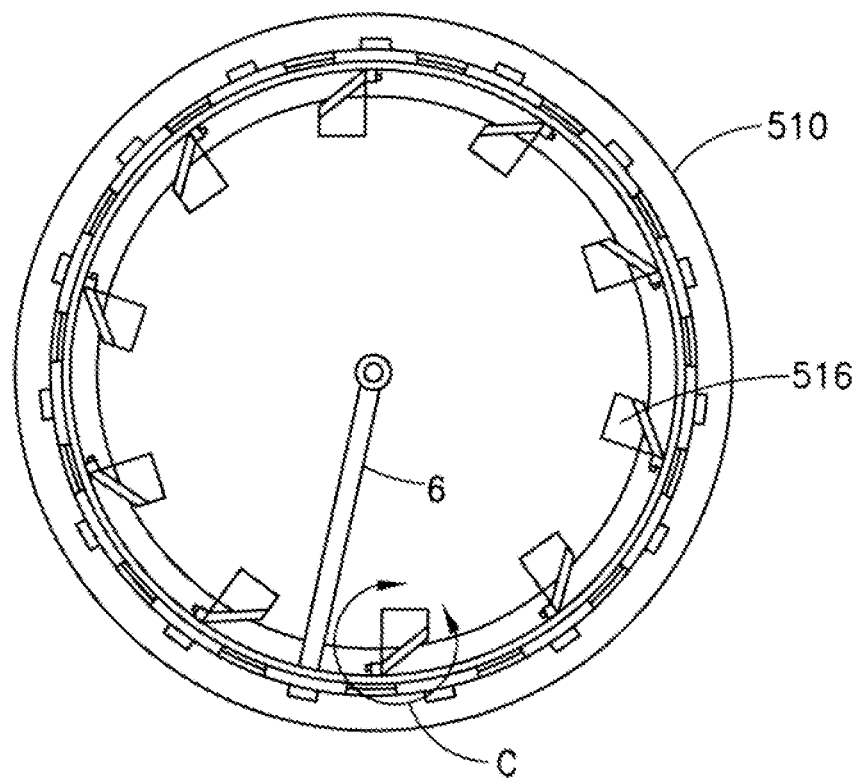

Other non-linear flighting configurations are contemplated herein. Such flighting are not curved but are angled strips that will scoop (i.e. collect) the carbon fiber and allow the carbon fiber to fall therefrom to the following flighting as the drum rotates. An example of such flighting is illustrated in FIGS. 11A-11B. FIG. 11A is a bent flight strip 516. The angle of the bend can be any suitable angle, for example 30°, 35°, 40°, 45°, 50°, 55°, 60°, 65°, 70°, 75°, 80°, 85°, 90°, etc. The flighting illustrated in FIG. 11A has a 45° degree bend. 518 and a small lip 517. The lip is sized to ensure that it keeps the carbon fiber from freely sliding out of the flighting but does not jam the carbon fiber from falling from the fighting as desired. The flighting 516 has cross bars 522, which are optionally provided for structural support. FIG. 11B illustrates the flighting 516 fastened into the rotating drum 510. As with the S-shaped and J-shaped flighting described herein, the angled strip flighting carries the carbon fiber as the drum rotates and then carbon fiber falls from a leading flighting to a following flighting as the drum rotates.

Figure 12:
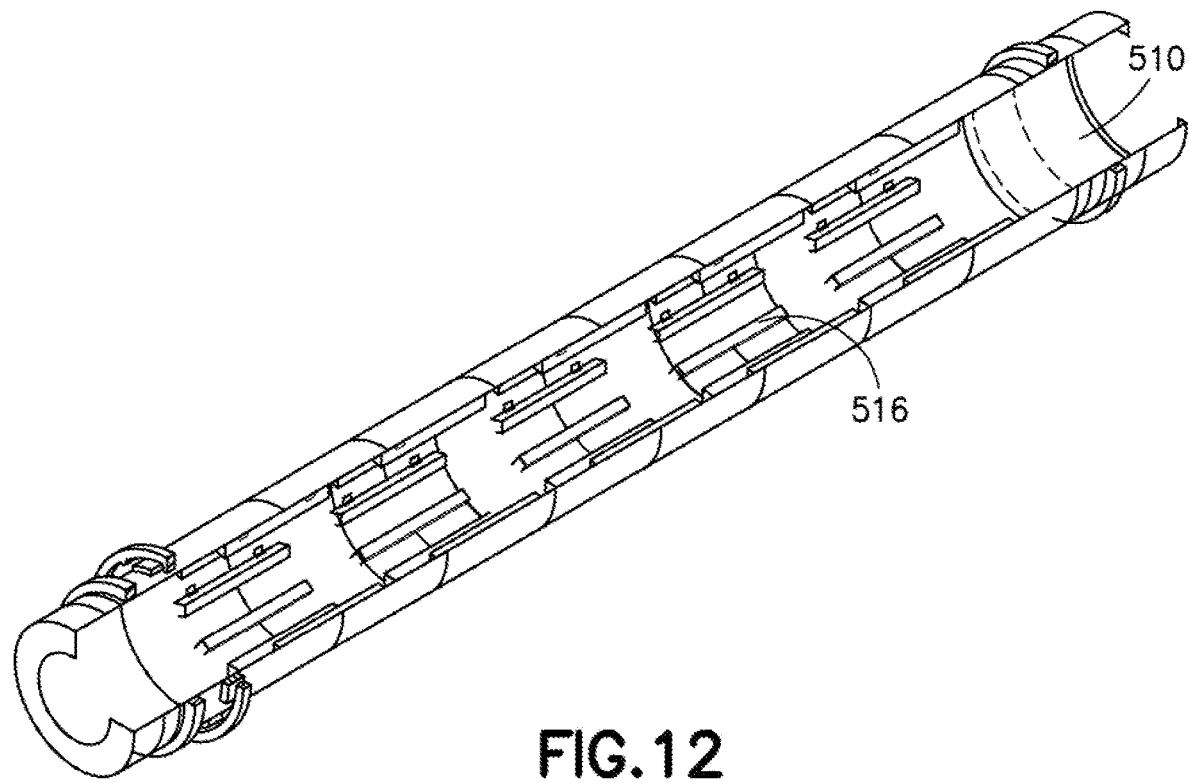
FIG. 12 is a cut-away view of a rotary drum with angled flighting.

FIG. 12 illustrates a drum 510 in a cut-away view to reveal the drum interior with the angled flighting 516 illustrated in FIGS. 11A-11B distributed in the drum. The flighting is arranged in an X×Y array where X is the number of flightings in a row in the axial direction of the drum 510 and Y is the number of flightings arranged along the inner circumference of the drum 510. The number and orientation of the flightings arranged within the drum is largely a matter of design choice.

Inert gas and steam are injected into the reactor at 220. Steam is injected into the reactor at the exit end 236 of the reactor. As described above, steam aids in removing coke particulate from the carbon fiber during the pyrolytic reaction that takes place. The steam also aids in thermal heat transfer within the reactor from the side walls of the reactor to the CFP waste being volatilized. Additionally, steam helps to create a counter current gas flow inside the reactor which carries away hydrocarbon gasses and stops those gasses from being deposited on liberated fiber as it travels towards the exit end of the reactor. As explained in detail above, relatively cold steam expands inside the reactor as it heats up at the exit end 236 of the reactor 210. The steam, along with other gasses in the reactor, exit from the entrance end 234 of the reactor 210. Nitrogen is also introduced into the reactor outlet at the double gate valves and specifically through the window port 220 to keep an inert environment within the reactor. As noted above, the small partial vacuum (e.g. about −2 oz/in$^2$ (−8.618 mbar) vacuum to −5 oz/in$^2$ (−21.546 mbar) is created at the entrance end of the reactor. The partial vacuum prevents unwanted or uncontrolled amounts of oxygen from the atmosphere from entering the reactor by creating an external compression force on the rotating drum seals and also creates conditions that cause a counterflow the gasses within the reactor relative to the flow of the CFP waste being moved by the helical screw. This countercurrent flow moves gasses and contaminants toward the entrance end of the reactor where those contaminants and gasses are extracted. It is to be appreciated that, in some instances, rather than using a vacuum to create a drum seal, the methods and apparatus described herein may be configured to use a double nitrogen purged slider seal system for creating a drum seal.

The outlet 225 at the exit end 236 of the reactor 210 is where the liberated carbon fiber exits from the rotating drum. The liberated carbon fiber passes through two gate valves (not shown) or, as described above, flapper valves. As noted above, the rotating drum 250 of the reactor 210 is on an incline and the carbon fiber flows toward the exit end 236 of the rotating drum via gravity feed. In the embodiment illustrated in FIGS. 8-10, two gate valves (415A, 415B) are used to allow the flow of carbon fiber into the first valve (415A), then accumulate therein. The atmosphere in the first gate valve (415A) is the same as the atmosphere within the reactor 300. Once the first gate valve (415A) is full, it can dump the accumulated load into the second (bottom) valve (415B). The top valve (415A) then closes and is ready to receive additional liberated carbon fiber material from the reactor 300. Once the top valve 415A re-closes, the bottom valve 415B opens, dumping the carbon fiber into a pneumatic conveyor pipe 425. The two gate valves (415A, 415B) are purged with nitrogen from nitrogen gas source 423 upon each actuation to ensure unwanted or an uncontrolled amount of oxygen does not have the opportunity to flow into the reactor 300.

Referring again to the FIG. 2 schematic of the reactor, the reactor 210 is equipped with a gas feed inlet 230 that permits the reactor to burn the non-condensable gases created from the reaction. As noted above, the non-condensable gasses are the low molecular weight gasses off gassed from the reaction. Optionally, the reactor can burn natural gas (supplied from a utility) or propane from a propane tank to start heating the reactor to the proper operating temperature. Once the operating temperature has been achieved, the CFP waste is introduced to the reactor. Optionally, the reactor can be fueled by oil, kerosene, diesel, electricity, or other energy forms. The introduction of the bulk CFP waste changes the thermal energy balance and the reactor must be properly balanced for its energy consumption. During this balancing time period it is possible to create gas from within the reactor, however it should be considered unreliable for volume/flow rate. Once the reactor has been balanced, the flow of gas created from the reaction may be adequate to run the required thermal energy input needed to sustain the reaction as long as additional CFP waste feedstock is introduced at a sufficient rate and it contains a high enough ratio of epoxy or thermoset resin to carbon fiber. It is to be appreciated that the reactor burners can be configured to burn the oil (i.e., the condensable gases) obtained from the pyrolysis of the waste materials. If the gas or oil created by the process does not provide sufficient fuel to the burners, the reactor burners can be configured to use additional fuels such as, but not limited to, natural gas, propane, etc.

A temperature of about 1250° F. (~677° C.) is maintained in the reactor while cold CFP waste is fed into the reactor. To maintain this temperature, a feedback loop is provided whereby additional fuel is burned to increase the thermal energy input to maintain the correct temperature. The thermocouple feedback loop that is connected to the burner system and that is described in more detail above is used to accomplish this requirement. Thermocouple feedback loops are well known to one skilled in the art and are not described in detail herein.

A gas extraction apparatus 235 is positioned at the entrance end 234 of the reactor 210. One example of a gas extraction apparatus is the pipe system described above. As noted above, a vacuum pump sufficient to move all input steam, nitrogen, and thermally expanded off gasses from the volatilized epoxy resins and thermosets is used downstream and creates the negative pressure described above. Optionally, the vacuum pump is run by an electric motor controlled by a Variable Frequency Drive controller connected to a pressure sensor that maintains the correct pressure within the reactor. The system may be equipped with a secondary gas extraction and pressure regulating device. In one aspect, such a device may be a linear actuator coupled to a venturi valve. The venturi valve is open and closed by the action of the actuator. The linear actuator is connected to and in communication with a pressure sensing device, wherein the connection is in the form of a feedback loop. When the pressure increases in reactor, the actuator, in response to the pressure sensor, opens the valve to allow more gas to pass through it. If the pressure in the reactor decreases, the linear actuator closes the valve to permit the pressure in the reactor to increase. In the instance of the closed valve, the vacuum fan will be running at a constant speed. A target negative pressure can be programmed and that target pressure can be increased or decreased by the reactor operator. This vacuum pump aides in the creation of the counter current flow within the reactor thereby moving the hydrocarbon gases created, contaminants, and water vapor to the extraction port at the entrance end of the reactor. These gases are piped into a wet scrubber 240. Alternatively, where a vapor recovery unit is used rather than a wet scrubber 240, the gasses are piped into a vapor recovery unit.

The wet scrubber 240 (FIG. 2)/370 (FIGS. 6-7) cools and condenses the hot hydrocarbon gases coming out of the reactor. The wet scrubber 240/370 is a housing where water is sprayed on the incoming gasses. Referring to FIGS. 6 and 7, hot gasses are introduced into the housing via the gas extraction piping 360 described above. Such scrubbers are well known to those skilled in the art and are not described in detail herein. The water introduced into the scrubber pools at the bottom of the housing 372, where oil 385 floats and water 372 settles out of the bottom of the pooled condensate. The water 372 is recycled, cooled, and pumped back to the top of the housing to be sprayed on new hot gasses entering the housing. Alternatively, where a vapor recovery unit is used rather than a wet scrubber 240, the vapor recovery unit is configured to quench the hot gasses. The vapors are separated in the vapor recovery unit. The oil is sent into an oil/water separator, and the oil is collected and stored in a tank or used to fuel the burners if desired. Excess vapors are sent to the reactor furnace or a thermal oxidizing unit for burning.

The oil floats off of the surface of the condensate and is separated through a series of baffles. This allows continuous processing and separation of oil from the reactor off gases from the reactor. Additionally, any carbon fibers entrained in the gas as well as coke particulate and water vapor are removed from the gas stream. The condensed oil can be captured and placed into a storage tank for sale. The water vapor is re-introduced into the wet scrubbers circulation system, and the contaminants within the gas stream (Carbon fiber and coke particles can be collected and re-introduced into the reactor where the coke can be recracked into gas, and the carbon fiber can be run through the reactor again to be collected with the main flow of fiber going through the reactor. In some instances, a radiator system may also be used to cool the circulating water that goes between the oil water separator and the vapor recovery unit.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

The indefinite articles "a" and "an," as used herein in the specification and in the claims, unless clearly indicated to the contrary, should be understood to mean "at least one."

The phrase "or," as used herein in the specification and in the claims, should be understood to mean "either or both" of the elements so conjoined, i.e., elements that are conjunctively present in some cases and disjunctively present in other cases. Multiple elements listed with "or" should be construed in the same fashion, i.e., "one or more" of the elements so conjoined. Other elements may optionally be present other than the elements specifically identified by the "or" clause, whether related or unrelated to those elements specifically identified. Thus, as a non-limiting example, a reference to "A or B", when used in conjunction with open-ended language such as "including" can refer, in one embodiment, to A only (optionally including elements other than B); in another embodiment, to B only (optionally including elements other than A); in yet another embodiment, to both A and B (optionally including other elements); etc.

While particular embodiments of this technology have been described, it will be evident to those skilled in the art that the present technology may be embodied in other specific forms without departing from the essential characteristics thereof. The present embodiments and examples are therefore to be considered in all respects as illustrative and not restrictive. The various features described or illustrated above, including any components thereof, may be combined or integrated in other systems. Moreover, certain features maybe omitted or not implemented. The various implementations described or illustrated above may be combined in any manner.

It will further be understood that any reference herein to subject matter known in the field does not, unless the contrary indication appears, constitute an admission that such subject matter is commonly known by those skilled in the art to which the present technology relates.

All references cited herein are incorporated by reference in their entirety and made part of this application.

The invention claimed is:

1. An apparatus for recovering carbon fiber from carbon fiber waste, the apparatus comprising:
   a mechanical feed adapted to carry carbon fiber waste into a reactor, the reactor comprising a rotating drum;
   a burner system for heating the reactor;
   the reactor comprising an inlet end and an outlet end;
   the inlet end having a first inlet adapted to receive the carbon fiber waste through a port that seals the reactor from an atmosphere outside of the reactor, the inlet end further comprising a gas outlet, the gas outlet preventing unwanted or uncontrolled amounts of oxygen from entering the reactor;
   an inlet located proximal to a mid-point of the reactor for optional introduction of oxygen into the reactor;
   the outlet end opposite the inlet end, the outlet end comprising an outlet for recovered carbon fiber conveyed from the reactor, the recovered carbon fiber outlet sealing the reactor from the atmosphere outside the reactor, the outlet end further comprising an inlet, for preventing unwanted or uncontrolled amounts of oxygen from entering the reactor; and
   the rotating drum set at incline toward the outlet end of the reactor, the incline causing the recovered carbon fiber to flow toward the outlet end of the reactor.

2. The apparatus of claim 1, wherein the rotating drum has an internal pressure of about atmospheric pressure to about −5 oz/in$^2$ (−21.546 mbar).

3. The apparatus of claim 2, further comprising a vacuum pump system fluidically connected to the reactor to introduce a partial vacuum into the reactor; wherein the partial vacuum causes steam to flow toward the inlet end of the reactor; and wherein a pressure in the reactor is a vacuum pressure of about −2 oz/in$^2$ (−8.618 mbar) vacuum to about −5 oz/in$^2$ (−21.546 mbar).

4. The apparatus of claim 3, wherein the carbon fiber waste is carbon-reinforced plastics, wherein the inlet end is at a vertical height higher than the outlet end, thereby causing a gravity flow of the carbon-reinforced plastics from the inlet end to the outlet end.

5. The apparatus of claim 1, wherein a gravity flow causes the recovered carbon fiber to flow from the inlet end of the reactor to the outlet end of the reactor.

6. The apparatus of claim 1, wherein the burner system maintains a reaction temperature in the rotating drum in a range of about 638° C. to about 1093° C.

7. The apparatus of claim 6, wherein the burner system maintains the reaction temperature at about 667° C.

8. The apparatus of claim 1, wherein the outlet for carbon fiber is selected from the group consisting of a double gate valve, rotary air locks, double rotary air locks, single gate valves, and screw conveyors.

9. The apparatus of claim 1, wherein the mechanical feed is a feed hopper in fluid communication with a screw conveyor.

10. The apparatus of claim 9, wherein the screw conveyor is a shaft-less center helical screw.

11. The apparatus of claim 1, wherein the rotating drum has a plurality of flighting strips attached to an interior surface of the rotating drum.

12. The apparatus of claim 11, wherein the plurality of flighting strips have a shaped surface.

13. The apparatus of claim 12, wherein the shaped surface is selected from the group consisting of an S-shaped surface, a J-shaped surface, a bent surface and an angled surface.

14. The apparatus of claim 13, wherein the flighting strips are a plurality of S-shaped flighting strips or J-shaped flighting strips.

15. The apparatus of claim 1, further comprising a nitrogen-generating system comprising a nitrogen source in fluid communication with the inlet.

16. The apparatus of claim 15, wherein the nitrogen-generating system is configured to optionally provide oxygen in addition to nitrogen.

17. The apparatus of claim 16, wherein the nitrogen-generating system comprises a regulator that controls the amount of oxygen combined with the nitrogen.

18. The apparatus of claim 17, wherein the regulator is programmable to provide a selected amount of oxygen combined with the nitrogen.

19. A pyrolytic method for recovering carbon fiber from carbon fiber waste comprising:
providing carbon fiber waste to a reactor comprising a rotating drum, the carbon fiber waste introduced at a proximal end of the rotating drum;
based upon the carbon fiber waste provided to the reactor, selecting between an oxygen free environment in the rotating drum or adding oxygen to the rotating drum;
causing the carbon fiber waste to flow from the proximal end of the rotating drum to a distal end of the rotating drum;
venting vapor from the proximal end of the rotating drum; and
using a burner system, maintaining a temperature in the rotating drum reactor of about 638° C. to about 1093° C. when operating in an oxygen-free environment and maintaining a temperature in the rotating drum reactor of about 500° C. to about 550° C. when oxygen is added to the reactor.

20. The method of claim 19, further comprising maintaining a partial vacuum in the rotating drum.

21. The method of claim 20, wherein the partial vacuum in the rotating drum reactor is about −2 oz/in$^2$ (−8.618 mbar) vacuum to about −5 oz/in$^2$ (−21.546 mbar).

22. The method of claim 21, wherein the partial vacuum pressure is selected to cause the vapor to flow in a direction opposite to the direction in which the carbon fiber waste flows in the reactor.

23. The method of claim 19, wherein the rotating drum in the reactor has an internal pressure of about atmospheric pressure to less than about −5 oz/in$^2$ (−21.546 mbar).

24. The method of claim 19, wherein the carbon fiber waste is pyrolyzed in the heated rotating drum.

25. The method of claim 24, wherein the carbon fiber waste is held at a reaction temperature for a predetermined time sufficient volatilize a matrix in which carbon fibers are mixed.

26. The method of claim 25, wherein the matrix is an epoxy/thermoset resin matrix.

27. The method of claim 19, wherein the temperature in the rotating drum reactor is maintained at about 667° C.

28. The method of claim 19, wherein the rotating drum has a plurality of flighting strips attached to an interior surface of the rotating drum.

29. The method of claim 28, wherein the plurality of flighting strips have a shaped surface.

30. The method of claim 29, wherein the shaped surface is selected from the group consisting of an S-shaped surface, a J-shaped surface, a bent surface and an angled surface.

31. The method of claim 29, wherein the flighting strips are a plurality of S-shaped flighting strips or J-shaped flighting strips.

32. The method of claim 19, wherein the oxygen is introduced at about a mid-point of the rotating drum between proximal and distal ends of the rotating drum.

33. The method of claim 19, wherein an amount of oxygen added to the reactor is about 1% by volume to about 2% by volume.

34. The method of claim 19, wherein a nitrogen generating system comprising a nitrogen source is fluidly coupled to the rotating drum and is operated to select between an oxygen-free environment in the rotating drum or adding oxygen to the rotating drum.

* * * * *